(12) United States Patent
Sakumoto et al.

(10) Patent No.: US 9,602,285 B2
(45) Date of Patent: Mar. 21, 2017

(54) AUTHENTICATION DEVICE, AUTHENTICATION METHOD, AND PROGRAM

(71) Applicant: SONY CORPORATION, Tokyo (JP)

(72) Inventors: Koichi Sakumoto, Tokyo (JP); Taizo Shirai, Kanagawa (JP); Harunaga Hiwatari, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/719,495

(22) Filed: May 22, 2015

(65) Prior Publication Data

US 2015/0256342 A1    Sep. 10, 2015

Related U.S. Application Data

(63) Continuation of application No. 13/704,658, filed as application No. PCT/JP2011/065872 on Jul. 12, 2011, now Pat. No. 9,076,000.

(30) Foreign Application Priority Data

Jul. 30, 2010   (JP) ................................. 2010-171940
Oct. 4, 2010    (JP) ................................. 2010-224752

(51) Int. Cl.
*H04L 29/06*     (2006.01)
*H04L 9/32*      (2006.01)
(Continued)

(52) U.S. Cl.
CPC .......... *H04L 9/3221* (2013.01); *G06F 21/602* (2013.01); *H04L 9/0861* (2013.01);
(Continued)

(58) Field of Classification Search
None
See application file for complete search history.

(56) References Cited

U.S. PATENT DOCUMENTS 5,375,170 A * 12/1994 Shamir ................. H04L 9/3247
                                                   380/28
6,076,163 A *  6/2000 Hoffstein ............. H04L 9/3271
                                                   380/28
(Continued)

FOREIGN PATENT DOCUMENTS

CN    1910851 A    2/2007
CN    101410847 A  4/2009

OTHER PUBLICATIONS

Chinese Office Action issued on Apr. 29, 2015 in patent application No. 201180035779.5.
(Continued)

*Primary Examiner* — Farid Homayounmehr
*Assistant Examiner* — Maung Lwin
(74) *Attorney, Agent, or Firm* — Chip Law Group

(57) ABSTRACT

An authentication device includes circuitry that holds L (L≥2) secret keys $s_i$ (i=1 to L) and L public keys $y_i$ that satisfy $y_i=F(s_i)$ with respect to a set F of multivariate polynomials of n-th order (n≥2). The circuitry also performs with a verifier, an interactive protocol for proving knowledge of (L−1) secret keys $s_i$ that satisfy $y_i=F(s_i)$. The circuitry receives L challenges from the verifier, arbitrarily selects (L−1) challenges from the L challenges received. The circuitry also generates, by using the secret keys $s_i$, (L−1) responses respectively for the (L−1) challenges selected, and transmits the (L−1) responses generated.

14 Claims, 20 Drawing Sheets

(51) Int. Cl.
*G06F 21/60* (2013.01)
*H04L 9/30* (2006.01)
*H04L 9/08* (2006.01)

(52) U.S. Cl.
CPC .......... *H04L 9/3093* (2013.01); *H04L 9/3271* (2013.01); *H04L 9/3239* (2013.01); *H04L 2209/04* (2013.01)

(56) References Cited

U.S. PATENT DOCUMENTS

| | | | | |
|---|---|---|---|---|
| 6,259,790 B1* | 7/2001 | Takagi | ................. | H04L 9/3249 380/28 |
| 6,959,085 B1* | 10/2005 | Hoffstein | ................. | H04L 9/008 380/2 |
| 7,114,178 B2* | 9/2006 | Dent | ................. | G07C 9/00309 726/3 |
| 7,869,591 B1* | 1/2011 | Nagel | ................. | H04L 9/0825 380/28 |
| 2002/0136401 A1* | 9/2002 | Hoffstein | ................. | H04L 9/3255 380/30 |
| 2005/0271203 A1* | 12/2005 | Akiyama | ................. | H04L 9/3093 380/30 |
| 2006/0245587 A1* | 11/2006 | Pinkas | ................. | H04L 9/085 380/28 |
| 2007/0081667 A1* | 4/2007 | Hwang | ................. | H04L 9/3271 380/30 |
| 2007/0121936 A1* | 5/2007 | Guillou | ................. | H04L 9/3033 380/30 |
| 2008/0019511 A1* | 1/2008 | Akiyama | ................. | G06F 7/724 380/30 |
| 2009/0265544 A1* | 10/2009 | Moona | ................. | G06F 21/34 713/156 |
| 2010/0046746 A1* | 2/2010 | Yonemura | ................. | H04L 9/3033 380/30 |
| 2010/0318798 A1* | 12/2010 | Binding | ................. | G06F 21/54 713/170 |

OTHER PUBLICATIONS

European Extended Search Report Received for European Patent Application No. 11812261.3, mailed on Sep. 16, 2016, p. 8.

Constantin Popescu, "An Identification Scheme Based on the Elliptic Curve Discrete Logarithm Problem", University of Oradea, Department of Mathematics, Str. Armatei Romane 5, Oradea, Romania, pp. 624-625.

Vadim Lyubashevsky, "Lattice-Based Identification Schemes Secure Under Active Attacks", University of California, San Diego 9500 Gilman Drive, La Jolla, CA 92093-0404, USA, International Association for Cryptologic Research 2008, pp. 162-179.

Koichi Sakumoto, "Public-Key Identification Schemes Based on Multivariate Cubic Polynomials", Sony Corporation May 1, 2012 Kitashinagawa Shinagawa-ku, Tokyo 141-0001, Japan, International Association for Cryptologic Research 2012, pp. 172-189.

\* cited by examiner

PUBLIC KEY AUTHENTICATION SCHEME

SSH10a PUBLIC KEY AUTHENTICATION SCHEME

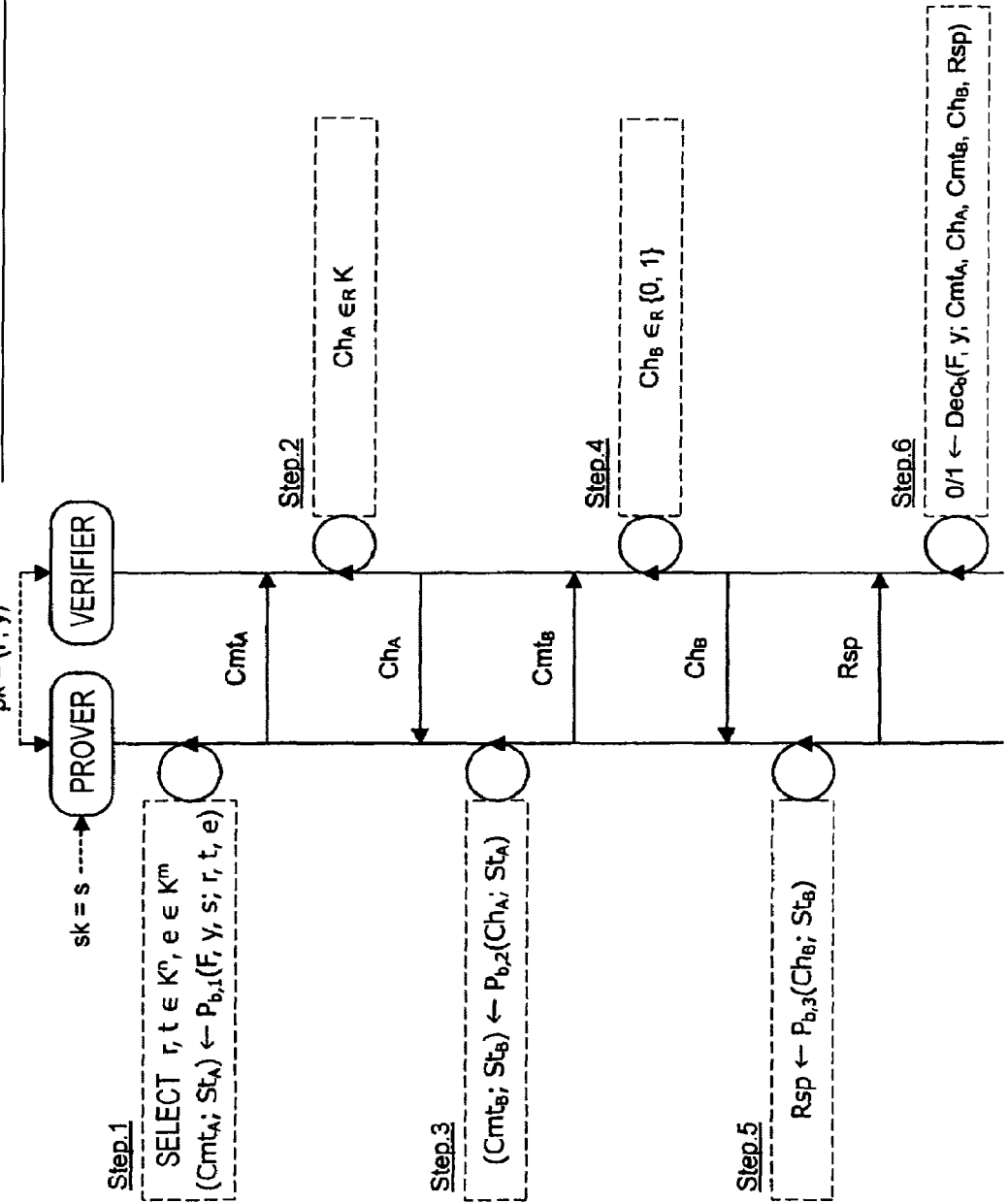

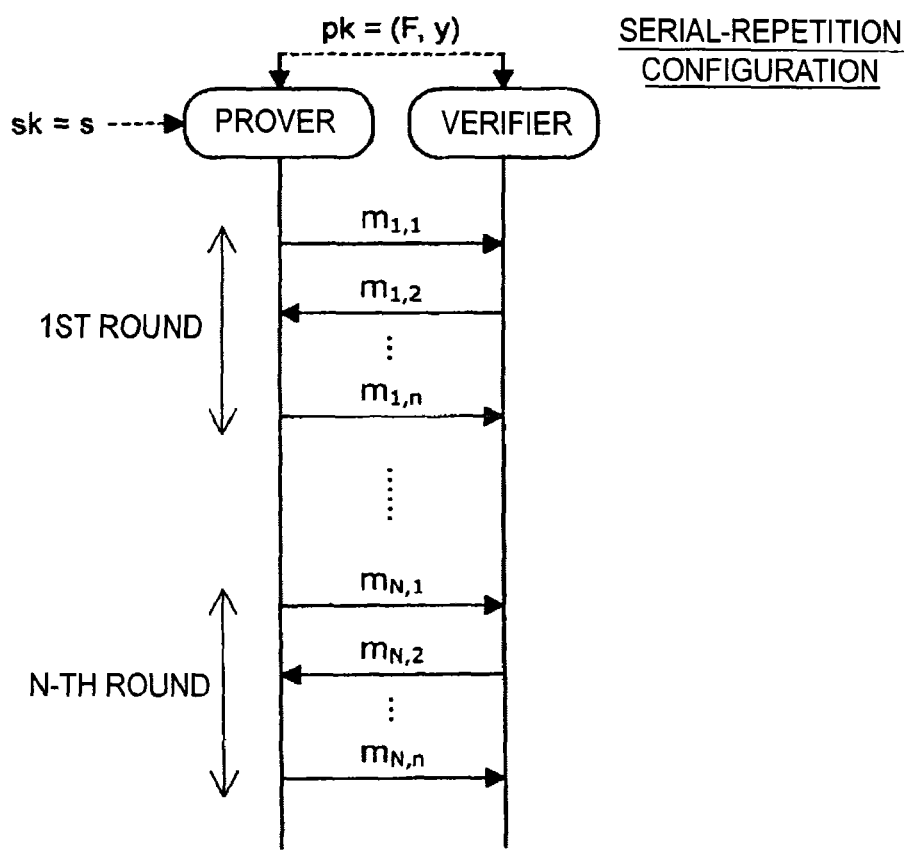
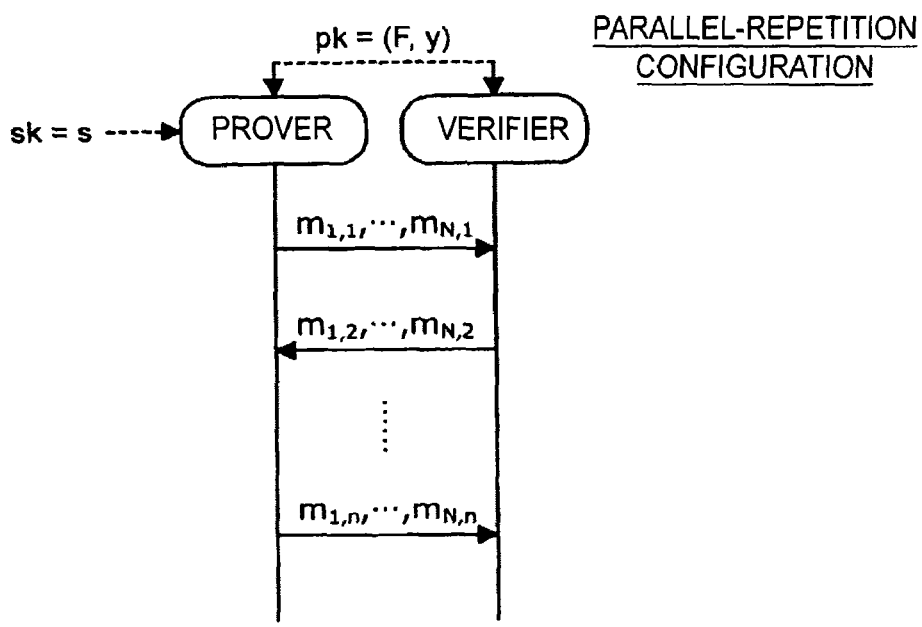

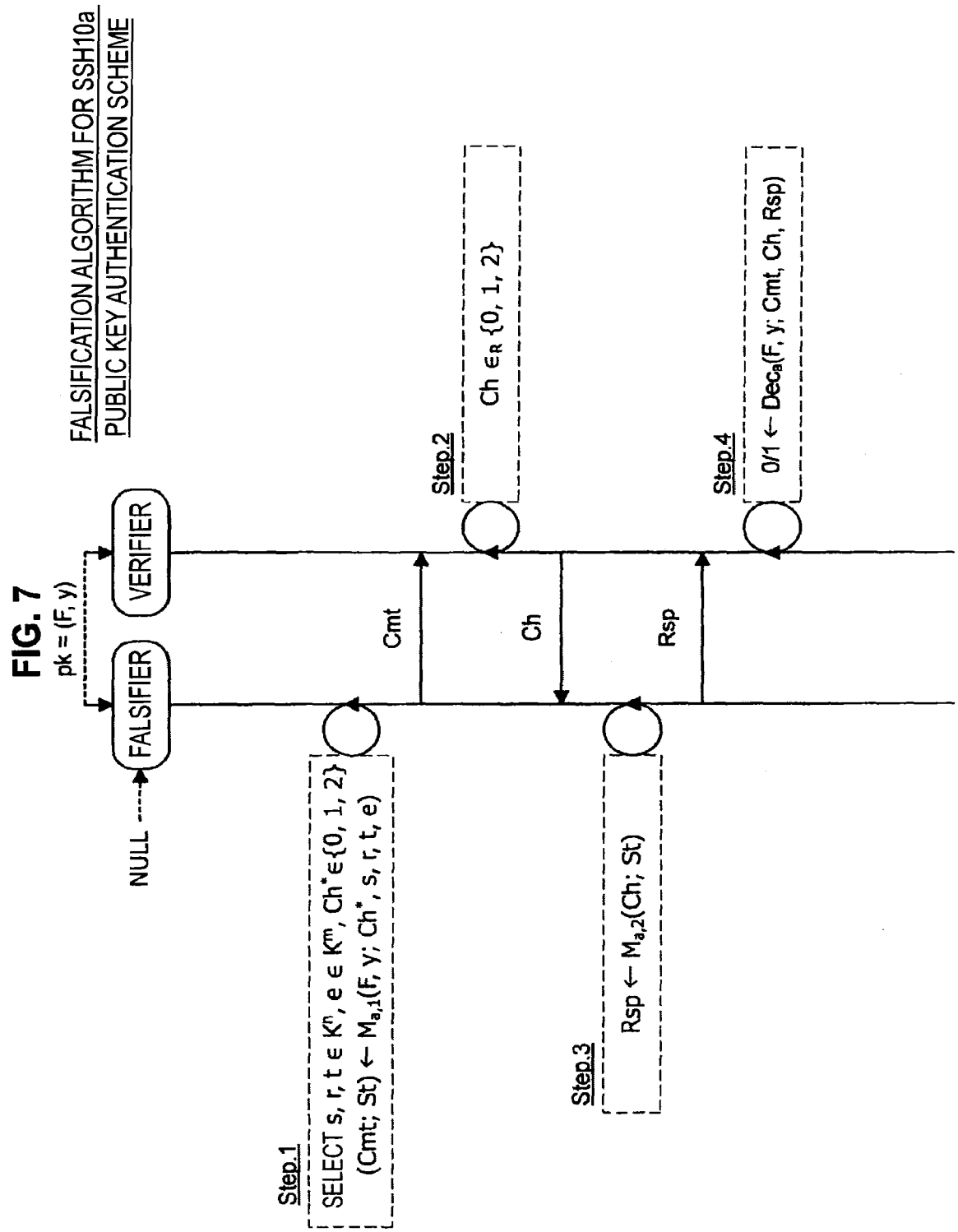

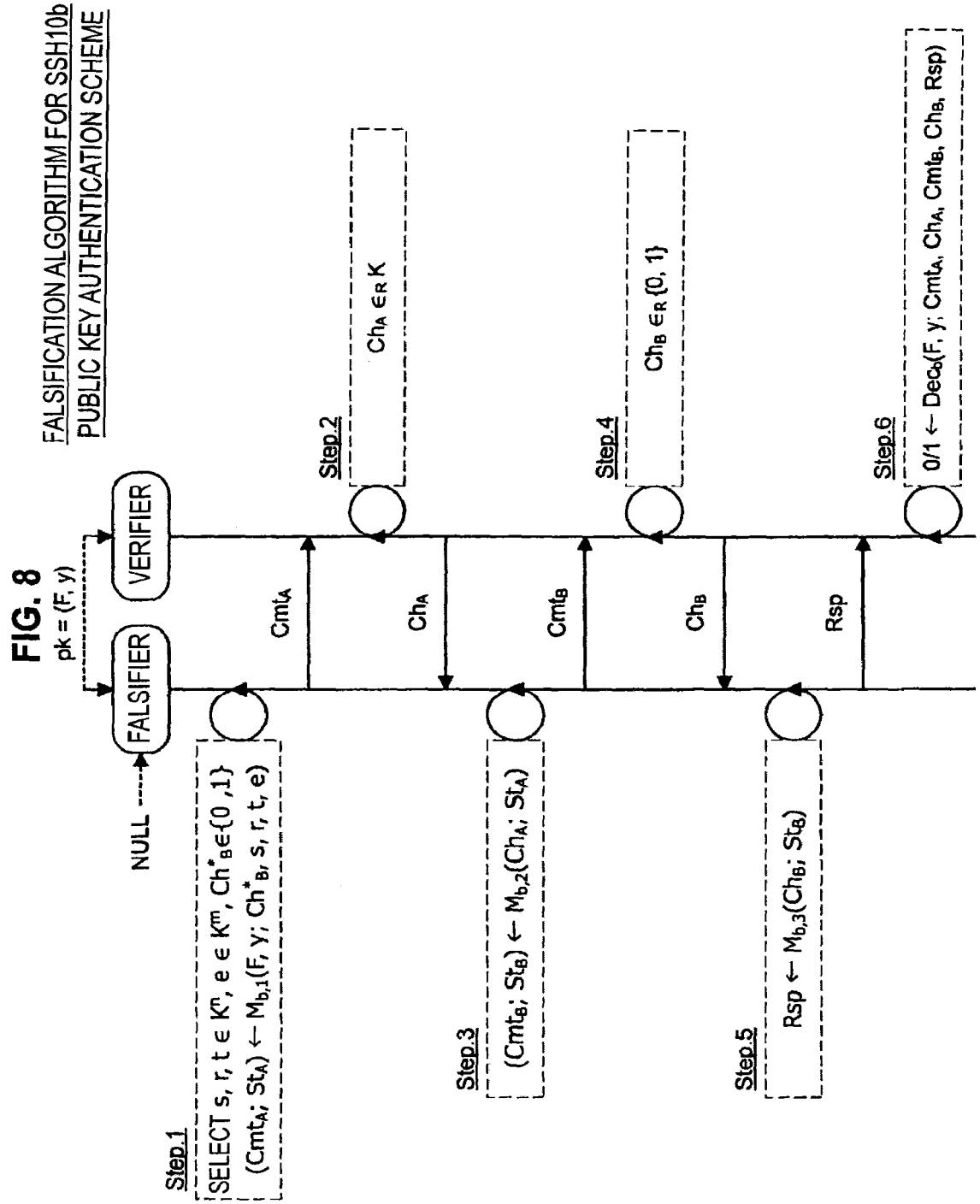

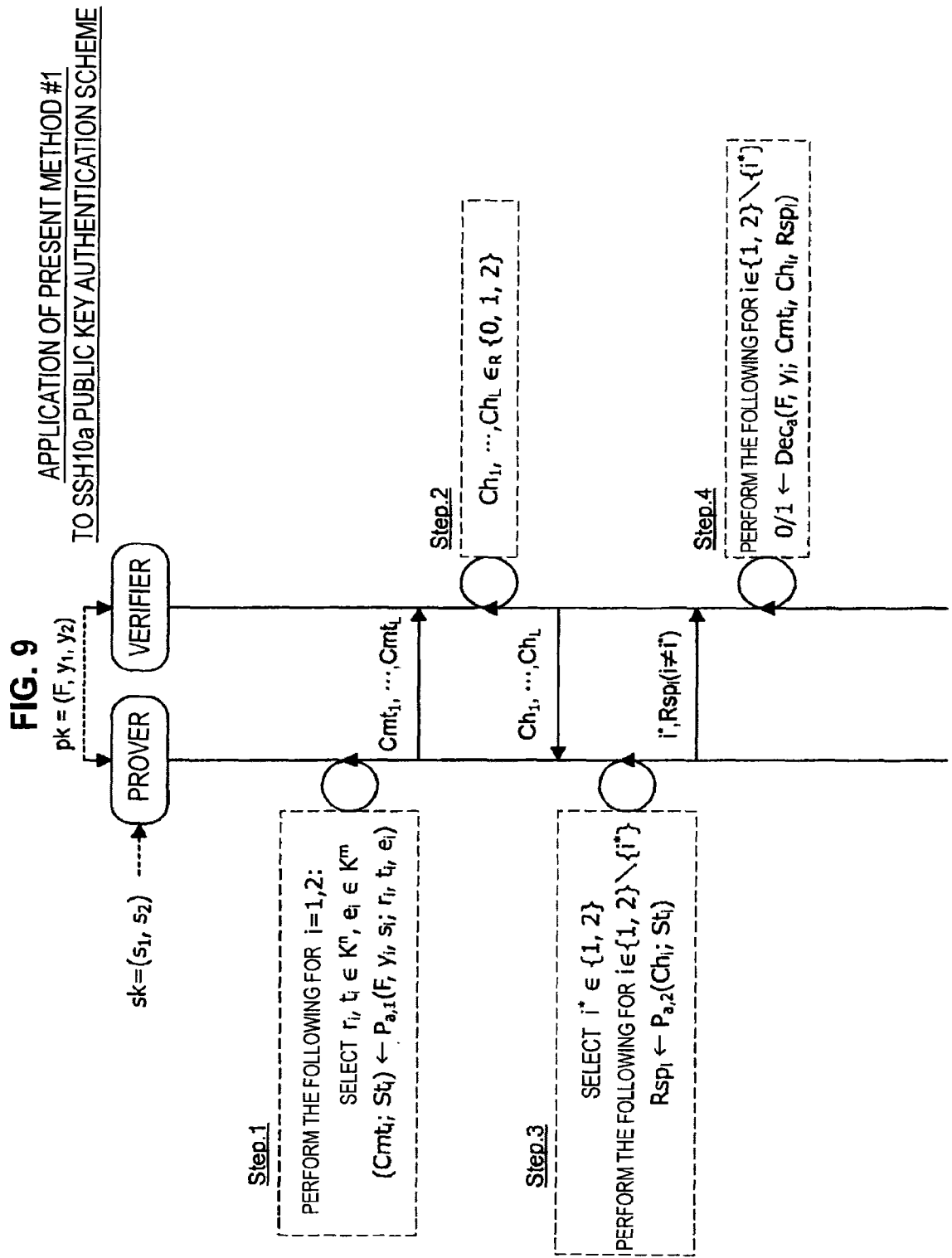

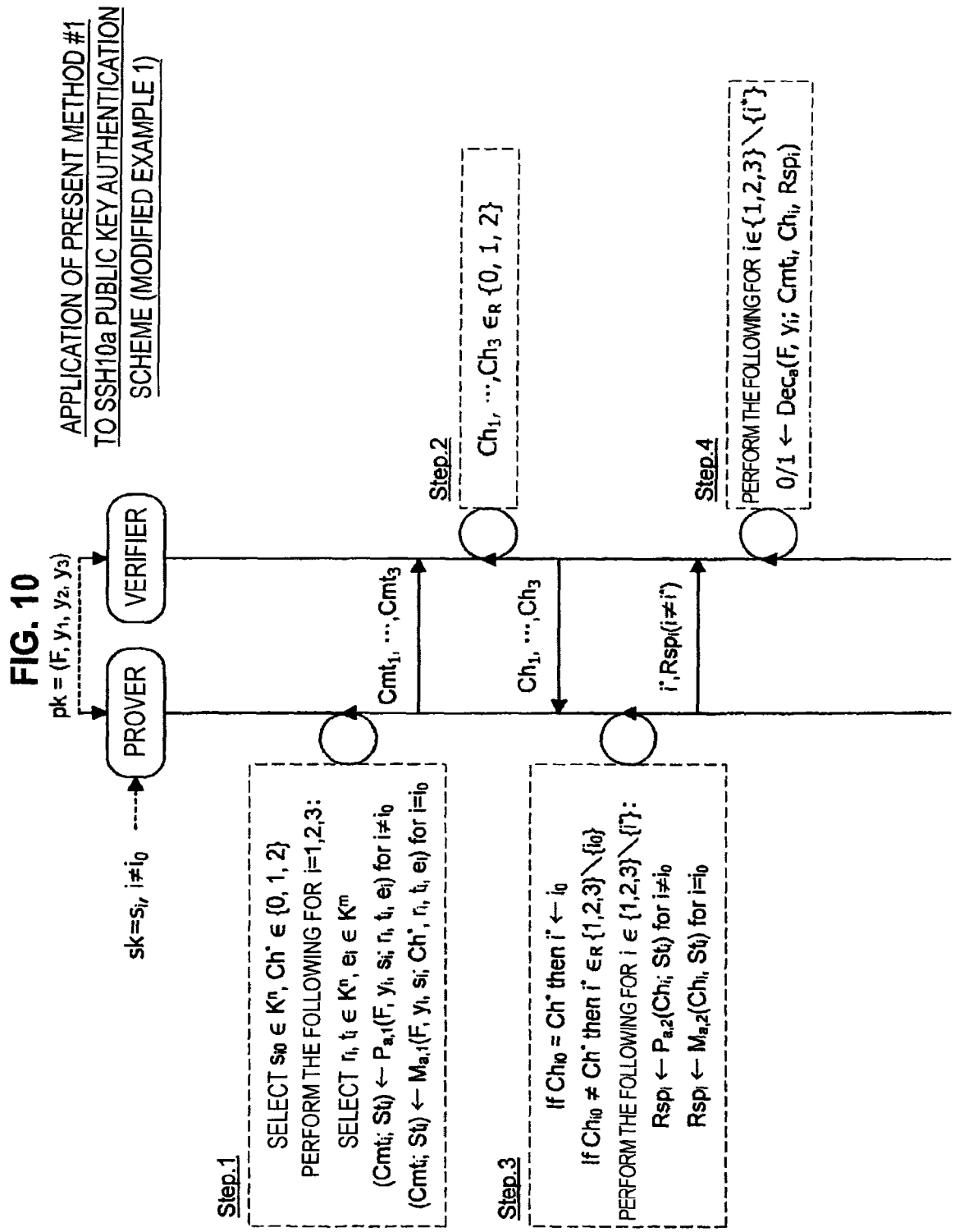

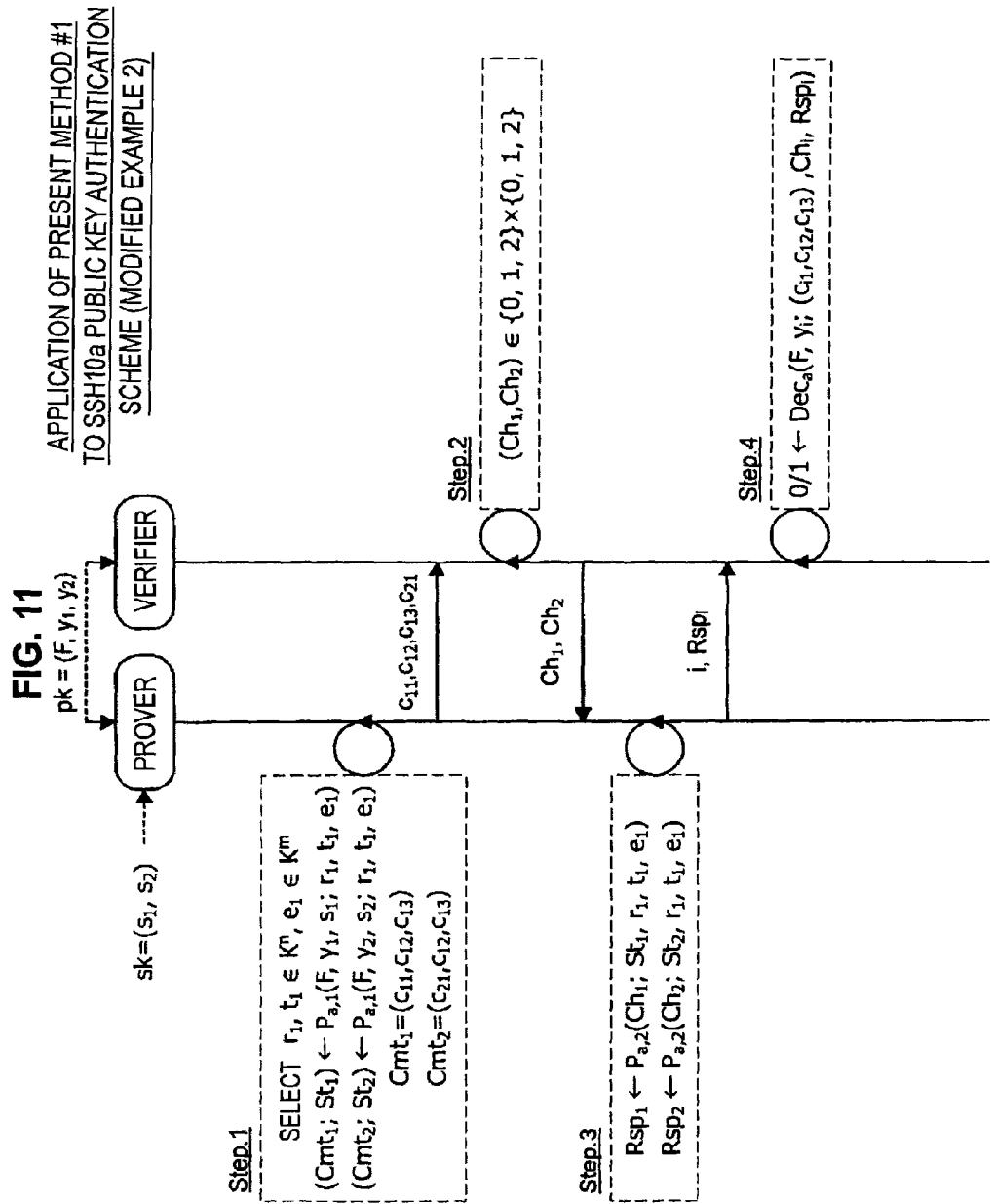

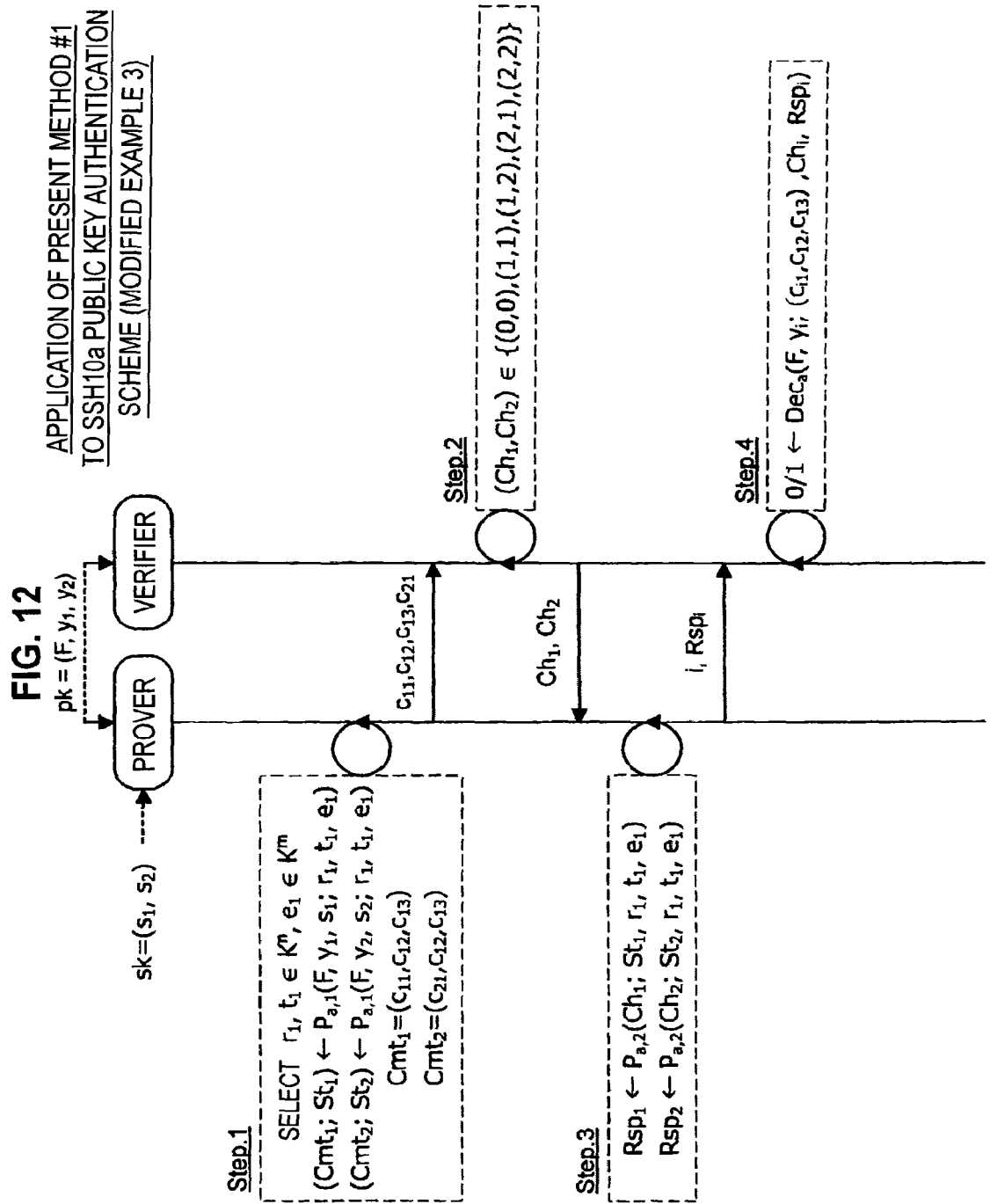

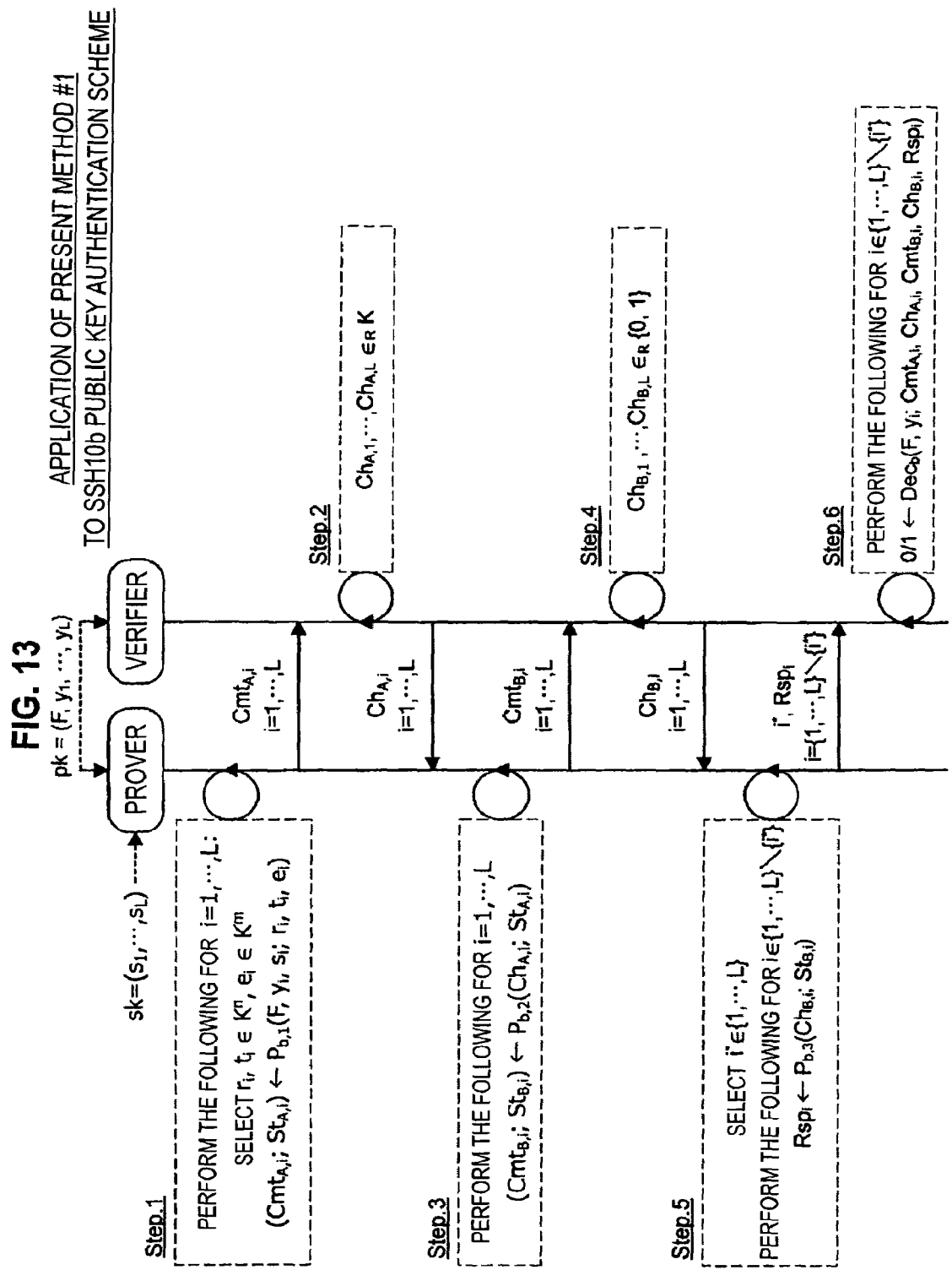

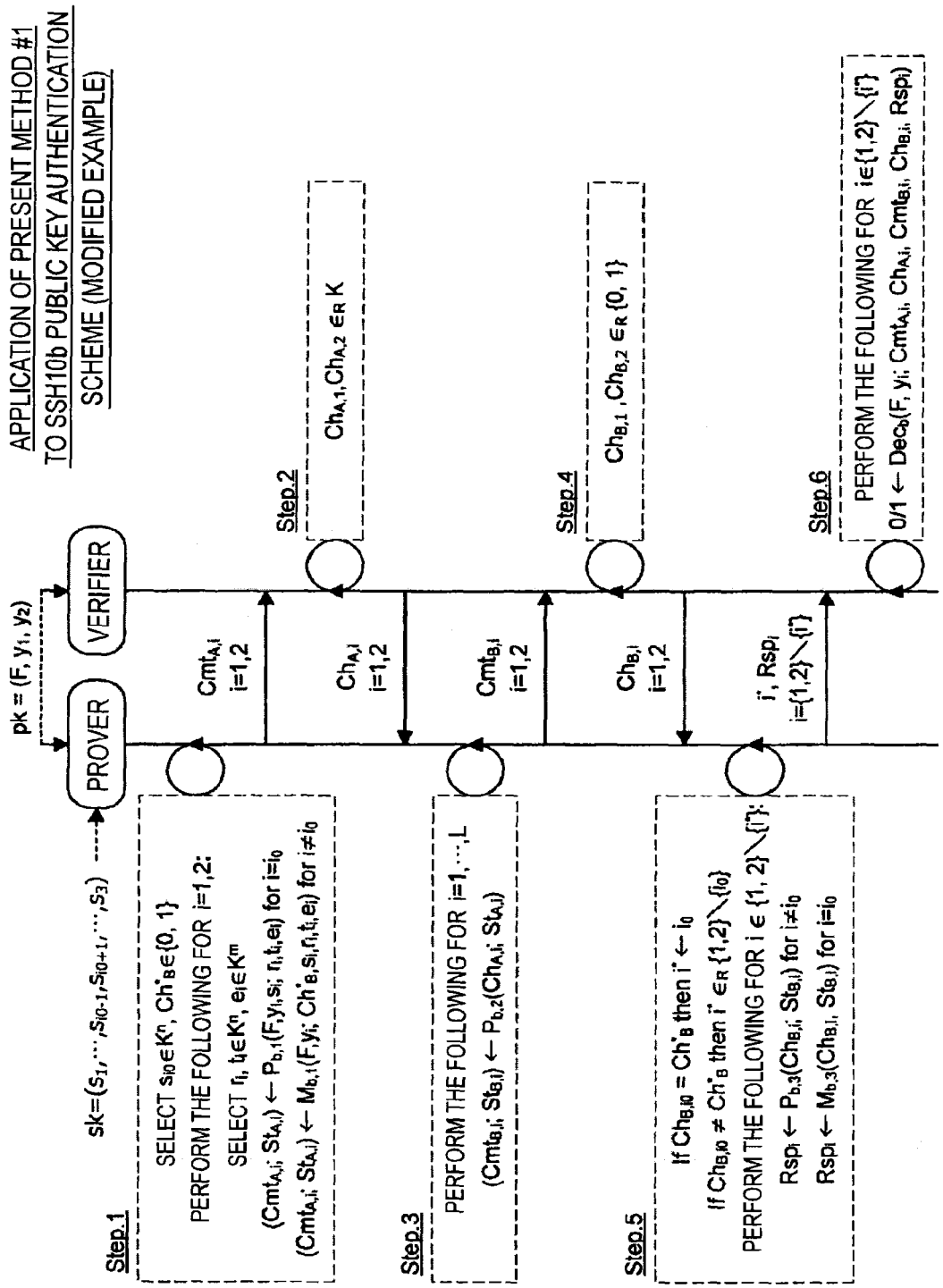

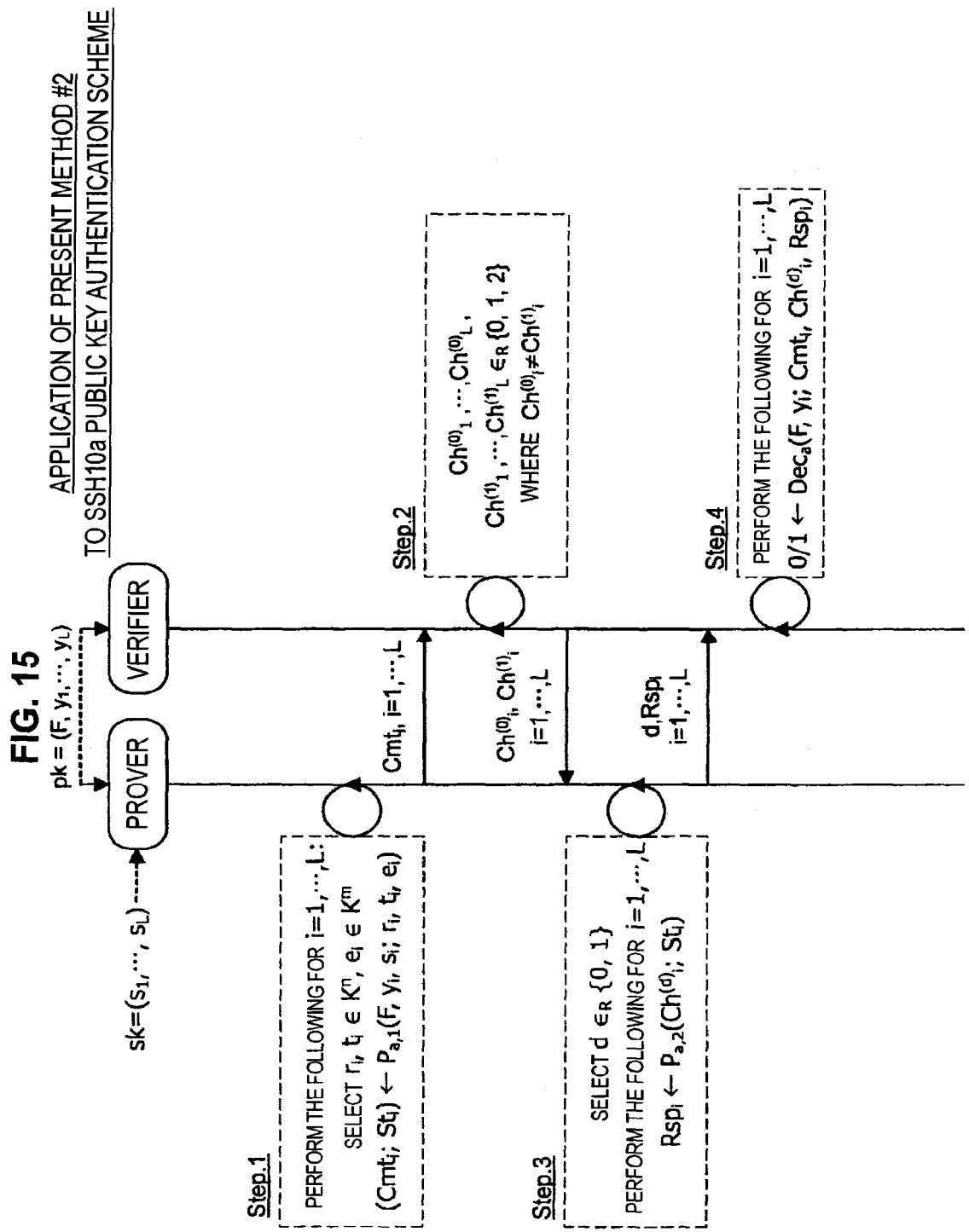

METHOD OF REDUCING COMMUNICATION AMOUNT (CASE OF SSH10a)

FIG. 20
METHOD OF REDUCING COMMUNICATION AMOUNT (CASE OF SSH10b)
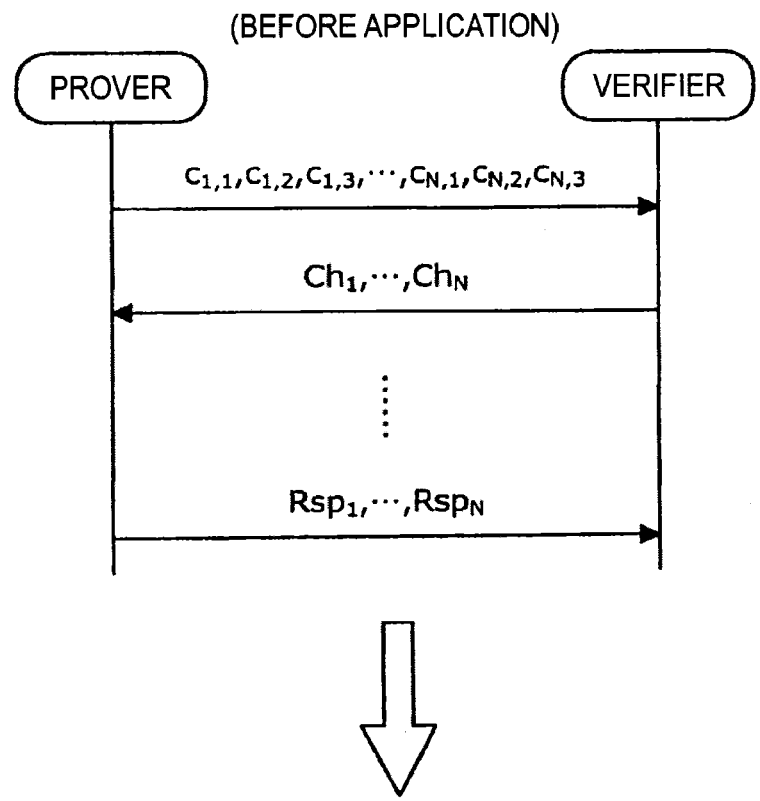
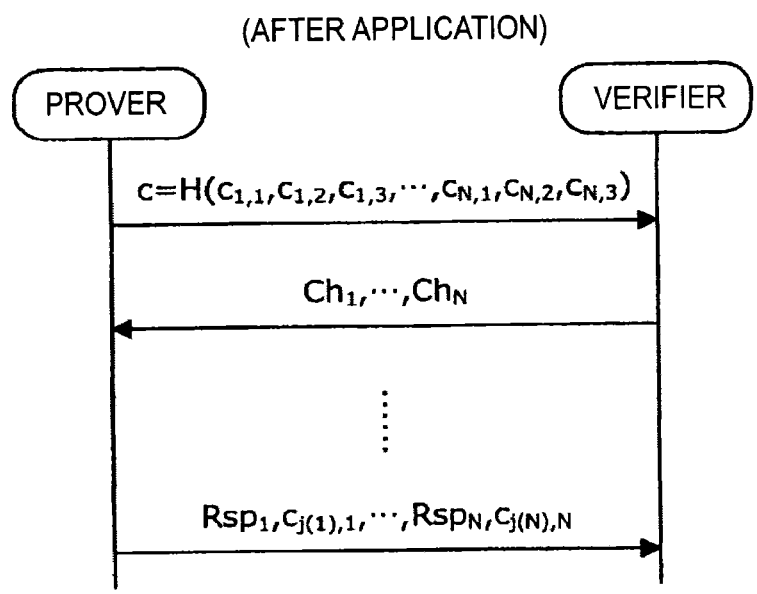

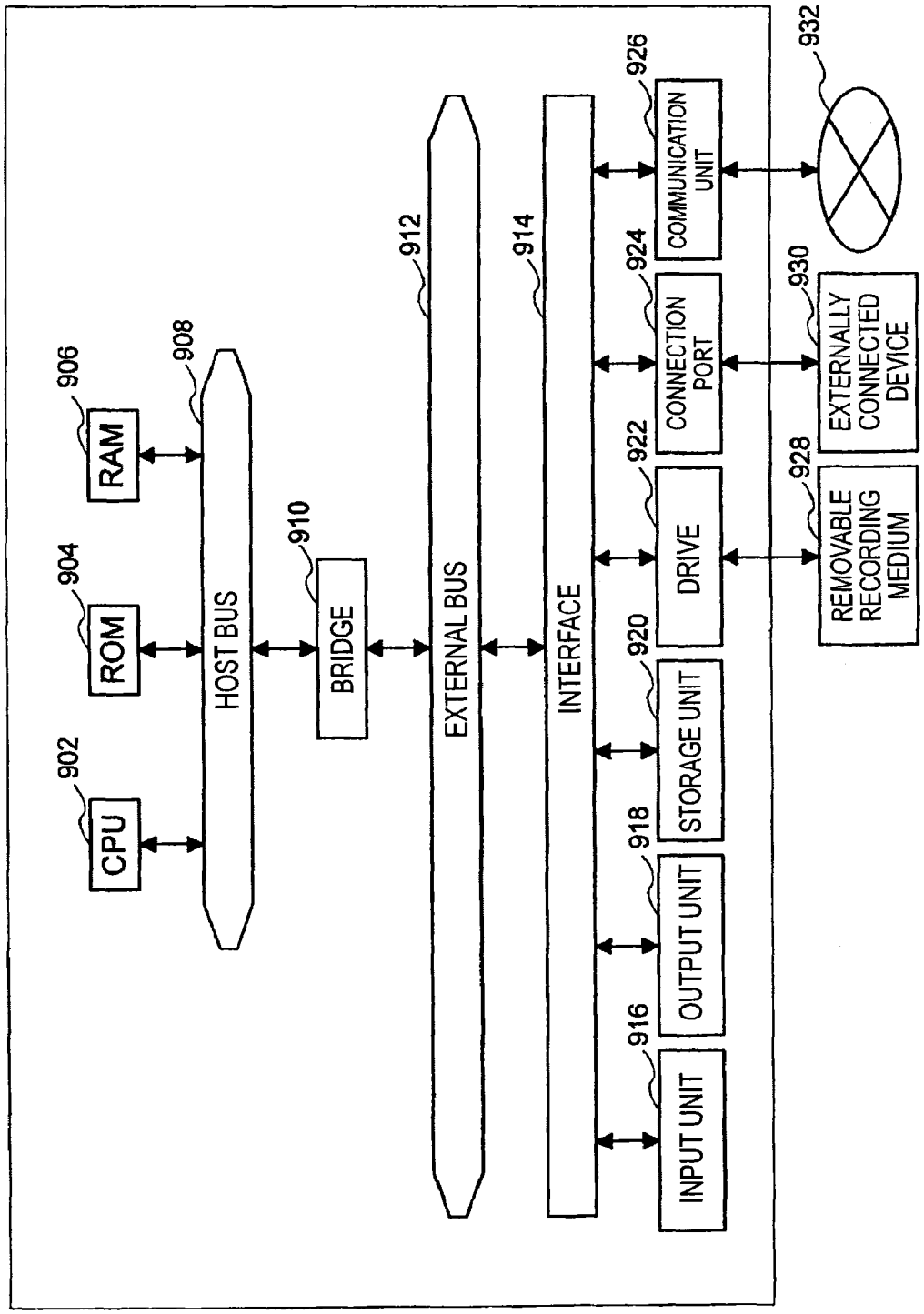

AUTHENTICATION DEVICE, AUTHENTICATION METHOD, AND PROGRAM

CROSS-REFERENCE TO RELATED APPLICATIONS

The present application is a continuation application of U.S. patent application Ser. No. 13/704,658, filed Dec. 17, 2012, which is a National Stage of PCT/JP2011/065872 filed Jul. 12, 2011, and claims the benefit of priority from prior Japanese Application No. 2010-224752, filed Oct. 4, 2010 and prior Japanese Application No. 2010-171940, filed Jul. 30, 2010. The entire contents of each of the above are incorporated herein by reference.

TECHNICAL FIELD

The present disclosure relates to an authentication device, an authentication method, and a program.

BACKGROUND ART

With a rapid development of information processing technology and communication technology, digitisation of documents, official and private, is rapidly advancing. Accordingly, many individuals and companies are greatly interested in security management of electronic documents. With the increase in the interest, security against tampering, such as eavesdropping and forgery of electronic documents, has come to be hotly debated in many fields. The security against eavesdropping on an electronic document is ensured by encrypting the electronic document, for example. Also, the security against forgery of an electronic document is ensured by using a digital signature, for example. However, encryption and the digital signature have to be sufficiently tamper-resistant.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, schemes that use a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public key authentication schemes that are currently used also take difficulty of the prime factorisation problem or the discrete logarithm problem as a basis for security. Thus, if the quantum computer is put to practical use, security of such digital signature schemes and public key authentication schemes will not be ensured. Accordingly, new digital signature schemes and public key authentication schemes are desired that take as a basis for security a problem different from problems such as the prime factorisation problem and the discrete logarithm problem that can be easily solved by the quantum computer. As a problem which is not easily solved by the quantum computer, there is a difficulty of solving a multivariate polynomial (hereinafter, multivariate polynomial problem), for example.

Other problems that are thought to be difficult to solve by the quantum computer include the Syndrome Decoding problem, the Constrained Linear Equation problem, the Permuted Kernel problem, the Permuted Perception problem, the section-finding problem on an algebraic surface, and the like.

Among these problems, problems other than the section-finding problem on an algebraic surface are known to be NP-hard. As their applications, for example, non-patent literature 1, and non-patent literature 2 mentioned below disclose public key authentication schemes based on the Syndrome Decoding problem. Furthermore, non-patent literature 3 mentioned below discloses a public key authentication scheme based on the Permuted Kernel problem. Other than these, a public key authentication scheme based on the Constrained Linear Equations problem, a public key authentication scheme based on the Permuted Perceptions problem, and the like are also proposed.

CITATION LIST

Non-Patent Literature

Non-Patent Literature 1: Jacques Stern, A New Identification Scheme Based on Syndrome Decoding, CRYPTO 1993, p 13-21

Non-Patent Literature 2: Jacques Stern, A New Paradigm for Public Key Identification, IEEE Transactions on Information Theory, 1996, p 13-21

Non-Patent Literature 3: Adi Shamir, An Efficient Identification Scheme Based on Permuted Kernels (Extended Abstract), CRYPTO 1989, p 606-609

SUMMARY OF INVENTION

Technical Problem

Reference will be made here to a security level of a public key authentication scheme. There are two security levels regarding the security level of the public key authentication scheme. One is a security level sufficient for a passive attack. The other is a security level sufficient for an active attack. The security level sufficient for a passive attack is a level of security that takes into account an attacker who can only eavesdrop on an interaction between a prover and a verifier that is in accordance with a legitimate protocol. On the other hand, the security level sufficient for an active attack is a level of security that takes into account a situation where an attacker himself can directly perform an interactive protocol with a prover. That is, the security level sufficient for an active attack takes into account a situation where an attacker can freely perform an interactive protocol with a prover.

The existing public key authentication schemes described in the non-patent literatures 1 to 3 mentioned above guarantee the security level sufficient for a passive attack. However, with regard to these existing public key authentication schemes, in the case of a parallel-repetition configuration, it is not known whether the security level sufficient for an active attack is absolutely guaranteed or not. This is because, in the case of the parallel-repetition configuration, it is generally known that zero-knowledge is not preserved. Therefore, to absolutely guarantee the security level sufficient for an active attack in the parallel-repetition configuration, it is necessary to guarantee further another property.

The existing public key authentication scheme are schemes where a prover proves to a verifier "knowing the s that satisfies y=F(s) for y" by using one key pair (public key y, secret key s). Accordingly, if interaction that will be accepted by verification was performed, it was not possible to prevent the verifier from knowing the information that "the prover who performed the interaction used the s." Furthermore, in the parallel-repetition configuration of a public key authentication scheme of this type, if collision resistance was not guaranteed for the F, it was not known if the security level sufficient for an active attack was absolutely guaranteed or not. In fact, the collision resistance is not guaranteed for the function F used in the public key authentication schemes described above.

In light of the foregoing, it is desirable to provide an authentication device, an authentication method, and a program which are novel and improved, and which are capable of guaranteeing a security level sufficient for an active attack even if an interactive protocol is repeatedly performed in parallel.

Solution to Problem

According to an aspect of the present disclosure in order to achieve the above-mentioned object, there is provided an authentication device which includes a key holding unit for holding L (L≥2) secret keys $s_i$ (i=1 to L) and L public keys $y_i$ that satisfy $y_i=F(s_i)$ with respect to a set F of multivariate polynomials of n-th order (n≥2), and an interactive protocol execution unit for performing, with a verifier, an interactive protocol for proving knowledge of (L−1) secret keys $s_i$ that satisfy $y_i=F(s_i)$. The interactive protocol execution unit prevents, at the time of performing the interactive protocol with the verifier, the verifier from knowing which secret key $s_i$ was used.

Further, the interactive protocol execution unit may include a challenge reception unit for receiving L challenges $Ch_i$ from the verifier, a challenge selection unit for arbitrarily selecting (L−1) challenges $Ch_i$ from the L challenges $Ch_i$ received by the challenge reception unit, a response generation unit for generating, by using the secret keys $s_i$, (L−1) responses $Rsp_i$ respectively for the (L−1) challenges $Ch_i$ selected by the challenge selection unit, and a response transmission unit for transmitting the (L−1) responses $Rsp_i$ generated by the response generation unit to the verifier.

Further, the interactive protocol execution unit may further include a message transmission unit for transmitting, to the verifier, messages $Cmt_i$ each corresponding to each of the L secret keys $s_i$. In this case, the challenge reception unit receives a challenge $Ch_i$ indicating a verification pattern selected from k (k≥2) verification patterns by the verifier according to each message $Cmt_i$ transmitted by the message transmission unit.

Further, in a case of the message $Cmt_i=(c_{i,1}, \ldots, c_{i,N})$, the message transmission unit may calculate a new message $Cmt'=H(Cmt_i, \ldots, Cmt_L)$ using a one-way function H and transmits this message $Cmt'$ to the verifier, and the response transmission unit may transmit, together with the response $Rsp_i$, an element of the message $Cmt_i$ that the verifier is not able to restore even when using this response $Rsp_i$.

Further, the key holding unit may not have to hold one secret key $s_{i0}$ (1≤$i_0$≤L) among the L secret keys $s_i$. In this case, the interactive protocol execution unit performs, based on a falsification algorithm, processing related to the secret key $s_{i0}$ that is to be performed in the interactive protocol.

Further, according to another aspect of the present disclosure in order to achieve the above-mentioned object, there is provided an authentication device which includes a key holding unit for holding L secret keys $s_i$ (i=1 to L) and L public keys $y_i$ that satisfy $y_i=F(s_i)$ with respect to a set F of multivariate polynomials of n-th order (n≥2), a challenge reception unit for receiving Q sets (Q≥2) of L challenges $Ch_i^{(j)}$ (j=1 to Q) from a verifier, a challenge selection unit for arbitrarily selecting one set of L challenges $Ch_i^{(j)}$ from the Q sets of L challenges) $Ch_i^{(j)}$ received by the challenge reception unit, a response generation unit for generating, by using the secret keys $s_i$, L responses $Rsp_i$ respectively for the L challenges $Ch_i^{(j)}$ selected by the challenge selection unit, and a response transmission unit for transmitting the L responses $Rsp_i$ generated by the response generation unit to the verifier.

Further, the interactive protocol execution unit may further include a message transmission unit for transmitting, to the verifier, messages $Cmt_i$ respectively corresponding to the L secret keys $s_i$. In this case, the challenge reception unit receives a challenge $Ch_i^{(j)}$ indicating a verification pattern selected from k (k≥2) verification patterns by the verifier according to each message $Cmt_i$ transmitted by the message transmission unit.

Further, in a case of the message $Cmt_i=(c_{i,1}, \ldots, c_{i,N})$, the message transmission unit may calculate a new message $Cmt'=H(Cmt_1, \ldots, Cmt_L)$ using a one-way function H and transmits this message $Cmt'$ to the verifier, and the response transmission unit may transmit, together with the response $Rsp_i$, an element of the message $Cmt_i$ that the verifier is not able to restore even when using this response $Rsp_i$.

Further, according to another aspect of the present disclosure in order to achieve the above-mentioned object, there is provided an authentication method which includes a key generating step for generating L (L≥2) secret keys $s_i$ (i=1 to L) and L public keys $y_i$ that satisfy $y_i=F(s_i)$ with respect to a set F of multivariate polynomials of n-th order (n≥2), and an interactive protocol performing step for performing, with a verifier, an interactive protocol for proving knowledge of (L−1) secret keys $s_i$ that satisfy $y_i=F(s_i)$. The interactive protocol execution step prevents, at the time of performing the interactive protocol with the verifier, the verifier from knowing which secret key $s_i$ was used.

Further, according to another aspect of the present disclosure in order to achieve the above-mentioned object, there is provided a program for causing a computer to realize a key holding function of holding L (L≥2) secret keys $s_i$ (i=1 to L) and L public keys $y_i$ that satisfy $y_i=F(s_i)$ with respect to a set F of multivariate polynomials of n-th order (n≥2), and an interactive protocol execution function of performing, with a verifier, an interactive protocol for proving knowledge of (L−1) secret keys $s_i$ that satisfy $y_i=F(s_i)$. The interactive protocol execution function prevents, at the time of performing the interactive protocol with the verifier, the verifier from knowing which secret key $s_i$ was used.

Further, according to another aspect of the present disclosure in order to achieve the above-mentioned object, there is provided an authentication method which includes a key generating step for generating L secret keys $s_i$ (i=1 to L) and L public keys $y_i$ that satisfy $y_i=F(s_i)$ with respect to a set F of multivariate polynomials of n-th order (n≥2), a challenge receiving step for receiving Q sets (Q≥2) of L challenges $Ch_i^{(j)}$ (j=1 to Q) for a verifier, a challenge selecting step arbitrarily selecting one set of L challenges $Ch_i^{(j)}$ from the Q sets of L challenges $Ch_i^{(j)}$ that have been received in the challenge receiving step, a response generating step for generating, by using the secret keys $s_i$, L responses $Rsp_i$ respectively for the L challenges $Ch_i^{(j)}$ that have been selected in the challenge selecting step, and a response transmitting step for transmitting the L responses $Rsp_i$ that have been generated in the response generating step to the verifier.

Further, according to another aspect of the present disclosure in order to achieve the above-mentioned object, there is provided a program for causing a computer to realize a key holding function of holding L secret keys $s_i$ (i=1 to L) and L public keys $y_i$ that satisfy $y_i=F(s_i)$ with respect to multivariate polynomials F of n-th order (n≥2), a challenge reception function of receiving Q sets (Q≥2) of L challenges $Ch_i^{(j)}$ (j=1 to Q) from a verifier, a challenge selection function of arbitrarily selecting one set of L challenges $Ch_i^{(j)}$ from the Q sets of L challenges) $Ch_i^{(j)}$ received by the challenge reception function, a response generation function of generating, by using the secret keys $s_i$, L responses $Rsp_i$ respectively for the L challenges $Ch_i^{(j)}$ selected by the challenge selection function, and a response transmission function of transmitting the L responses $Rsp_i$ generated by the response generation function to the verifier. According to another embodiment of the present disclosure, there is provided a computer-readable recording medium in which the program is recorded.

Advantageous Effects of Invention

According to the embodiments of the present disclosure described above, it is possible to guarantee a security level sufficient for an active attack even if an interactive protocol is repeatedly performed in parallel.

BRIEF DESCRIPTION OF DRAWINGS

FIG. 4 is an explanatory diagram for describing an interactive protocol of an SSH10b public key authentication scheme;

FIG. 5 is an explanatory diagram for describing a serial-repetition configuration of an interactive protocol;

FIG. 6 is an explanatory diagram for describing a parallel-repetition configuration of an interactive protocol;

FIG. 7 is an explanatory diagram for describing a falsification algorithm against the interactive protocol of the SSH10a public key authentication scheme;

FIG. 8 is an explanatory diagram for describing a falsification algorithm against the interactive protocol of the SSH10b public key authentication scheme;

FIG. 9 is an explanatory diagram for describing a method of applying a present method #1 to the interactive protocol of the SSH10a public key authentication scheme;

FIG. 10 is an explanatory diagram for describing a method of applying the present method #1 to the interactive protocol of the SSH10a public key authentication scheme (modified example 1);

FIG. 11 is an explanatory diagram for describing a method of applying the present method #1 to the interactive protocol of the SSH10a public key authentication scheme (modified example 2);

FIG. 12 is an explanatory diagram for describing a method of applying the present method #1 to the interactive protocol of the SSH10a public key authentication scheme (modified example 3);

FIG. 13 is an explanatory diagram for describing a method of applying the present method #1 to the interactive protocol of the SSH10b public key authentication scheme;

FIG. 14 is an explanatory diagram for describing a method of applying the present method #1 to the interactive protocol of the SSH10b public key authentication scheme (modified example);

FIG. 15 is an explanatory diagram for describing a method of applying a present method #2 to the interactive protocol of the SSH10a public key authentication scheme;

FIG. 20 is an explanatory diagram for describing a method of reducing the amount of communication in the interactive protocol of the SSH10b public key authentication scheme; and FIG. 21 is an explanatory diagram for describing an example hardware configuration of an information processing apparatus capable of realizing an interactive protocol according to a present embodiment.

DESCRIPTION OF EMBODIMENTS

Figure 1:
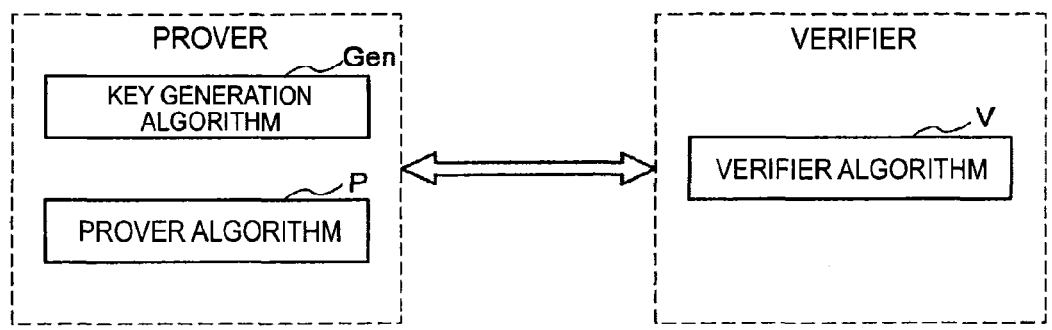
FIG. 1 is an explanatory diagram for describing an algorithm structure of a public key authentication scheme.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Explanation]

The flow of explanation on an embodiment of the present disclosure which will be described below will be briefly stated here. First, an algorithm structure of a public key authentication scheme will be described with reference to FIG. 1. Next, an n-pass public key authentication scheme will be described with reference to FIG. 2. Then, an interactive protocol of an SSH10a public key authentication scheme will be described with reference to FIG. 3. Then, an interactive protocol of an SSH10b public key authentication scheme will be described with reference to FIG. 4. Then, repetition configurations of an interactive protocol will be described with reference to FIGS. 5 and 6. At this point, a security level sufficient for an active attack will be briefly described.

Next, a falsification algorithm against the interactive protocol of the SSH10a public key authentication scheme will be described with reference to FIG. 7. Then, a falsification algorithm against the interactive protocol of the SSH10b public key authentication scheme will be described with reference to FIG. 8. Then, methods of applying a method according to a first embodiment (present method #1) of the present disclosure to the interactive protocol of the SSH10a public key authentication scheme will be described with reference to FIGS. 9 to 12. Then, methods of applying the present method #1 to the interactive protocol of the SSH10b public key authentication scheme will be described with reference to FIGS. 13 and 14.

Next, methods of applying a method according to a second embodiment (present method #2) of the present disclosure to the interactive protocol of the SSH10a public key authentication scheme will be described with reference to FIGS. 15 and 16. Then, methods of applying the present method #2 to the interactive protocol of the SSH10b public key authentication scheme will be described with reference to FIGS. 17 and 18. Then, methods of reducing the amount of communication in the interactive protocols of the present embodiments will be described with reference to FIGS. 19 and 20. Next, an example hardware configuration of an information processing apparatus capable of realizing interactive protocols according to present embodiments will be described with reference to FIG. 21. Lastly, technical ideas of the embodiment will be summarized and effects obtained by the technical ideas will be briefly described.

(Description Items)
1: Introduction
  1-1: Algorithm Structure of Public Key Authentication Scheme
  1-2: N-Pass Public Key Authentication Scheme
  1-3: Interactive Protocol of SSH10a Public Key Authentication Scheme
  1-4: Interactive Protocol of SSH10b Public Key Authentication Scheme
  1-5: Repetition Configuration of Interactive Protocol
  1-6: Falsification Algorithm against SSH10a Public Key Authentication Scheme
  1-7: Falsification Algorithm against SSH10b Public Key Authentication Scheme
2: First Embodiment (Present Method #1)
  2-1: Overview
  2-2: Application to SSH10a Public Key Authentication Scheme
  2-3: Application to SSH10a Public Key Authentication Scheme (Modified Example 1)
  2-4: Application to SSH10a Public Key Authentication Scheme (Modified Example 2)
  2-5: Application to SSH10a Public Key Authentication Scheme (Modified Example 3)
  2-6: Application to SSH10b Public Key Authentication Scheme
  2-7: Application to SSH10b Public Key Authentication Scheme (Modified Example)
3: Second Embodiment (Present Method #2)
  3-1: Overview
  3-2: Application to SSH10a Public Key Authentication Scheme
  3-3: Application to SSH10a Public Key Authentication Scheme (Modified Example)
  3-4: Application to SSH10b Public Key Authentication Scheme
  3-5: Application to SSH10b Public Key Authentication Scheme (Modified Example)
4: Supplement
  4-1: Extension of Scheme
  4-2: Non-Interactive Public Key Authentication Scheme
  4-3: Method of Reducing Amount of Communication
5: Hardware Configuration
6: Summary 1: Introduction Before describing embodiments of the present disclosure in detail, an algorithm structure of a general public key authentication scheme and an n-pass public key authentication scheme will be briefly described.

[1-1: Algorithm Structure of Public Key Authentication Scheme]

First, an algorithm structure of a public key authentication scheme will be described with reference to FIG. 1. FIG. 1 is an explanatory diagram for describing an algorithm structure of a public key authentication scheme.

(Overview)

A public key authentication scheme is an authentication scheme where a person (prover) convinces another person (verifier) that she is the prover herself by using a public key pk and a secret key sk. For example, a public key $pk_A$ of a prover A is made known to the verifier. On the other hand, a secret key $sk_A$ of the prover A is secretly managed by the prover. According to the public key authentication scheme, a person who knows the secret key $sk_A$ corresponding to the public key $pk_A$ is regarded as the prover A herself.

In the case the prover A attempts to prove to a verifier B that she is the prover herself, the prover A can perform an interactive protocol with the verifier B and prove that she knows the secret key $sk_A$ corresponding to the public key $pk_A$. Then, in the case it is proved by the verifier B, by the interactive protocol, that the prover A knows the secret key $sk_A$, the legitimacy of the prover A (that she is the prover herself) is proved.

Additionally, to ensure security of the public key authentication scheme, two conditions set forth below are to be satisfied.

The first condition is to lower as much as possible the probability of falsification being established, at the time the interactive protocol is performed, by a falsifier not having the secret key sk. That this first condition is satisfied is called "soundness." In other words, with a sound interactive protocol, falsification is not established by a falsifier not having the secret key sk with a non-negligible probability. The second condition is that, even if the interactive protocol is performed, information on the secret key $sk_A$ of the prover A is not at all leaked to the verifier B. That this second condition is satisfied is called "zero knowledge."

The security of the public key authentication scheme is ensured by using an interactive protocol having the soundness and zero knowledge as described above.

(Model)

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 21, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed is used to prove to the verifier of possession of the secret key sk corresponding to the public key pk. Formally, the key generation algorithm Gen is represented as formula (1) below as an algorithm that takes security parameter $1^\lambda$ ($\lambda$ is an integer of 0 or more) as an input and outputs the secret key sk and the public key pk.

[Expression 1]

$$(sk, pk) \leftarrow Gen(1^\lambda) \qquad (1)$$

(Prover Algorithm P)

The prover algorithm P is used by a prover. The prover algorithm P is an algorithm for proving possession of the secret key sk corresponding to the public key pk. The prover algorithm P is defined as an algorithm that takes the public key pk and the secret key sk of a prover as inputs and performs the interactive protocol with a verifier.

(Verifier Algorithm V)

The verifier algorithm V is used by a verifier. The verifier algorithm V is an algorithm for verifying, in the interactive protocol, whether or not a prover possesses the secret key sk corresponding to the public key pk. The verifier algorithm V is defined as an algorithm that takes the public key pk of a prover as an input, and that outputs 0 or 1 (1 bit) after performing the interactive protocol with the prover. Moreover, in the case of output 0, the prover is assumed to be illegitimate, and in the case of output 1, the prover is assumed to be legitimate.

(Supplement)

As described above, the public key authentication scheme has to satisfy two conditions, i.e. soundness and zero knowledge, to ensure security. However, in order to make a prover prove that she possesses the secret key sk, it is necessary that the prover perform a procedure dependent on the secret key sk, notify the verifier of the result and make the verifier perform verification based on the notified contents. Execution of the procedure dependent on the secret key sk is necessary to guarantee the soundness. On the other hand, it is necessary that information on the secret key sk is not at all leaked to the verifier even when the result of the procedure is notified to the verifier. Accordingly, the key generation algorithm Gen, the prover algorithm P, and the verifier algorithm V are designed so as to satisfy these terms.

In the foregoing, the algorithm structure of the public key authentication scheme has been described.

[1-2: N-Pass Public Key Authentication Scheme]

Figure 2:
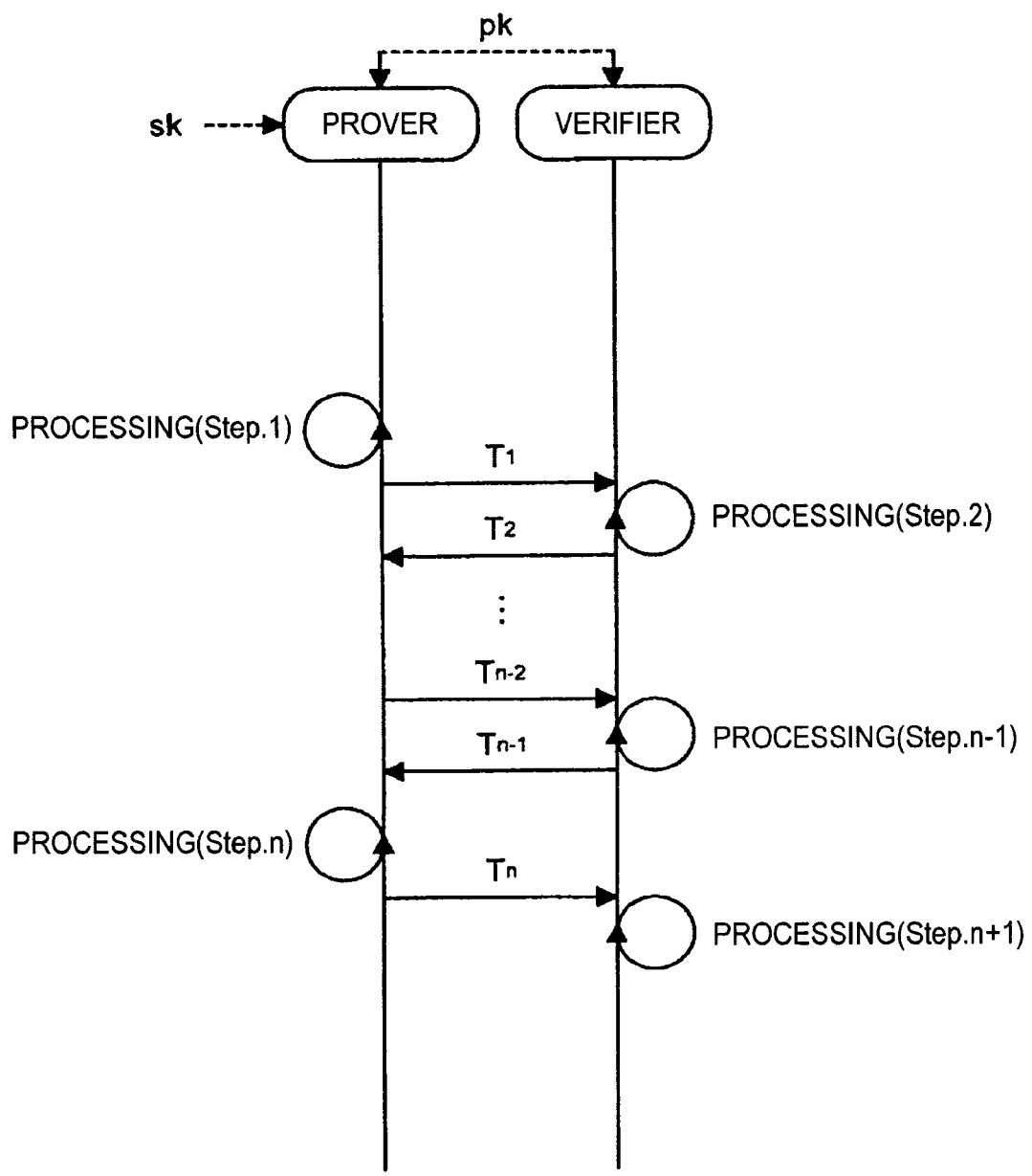
FIG. 2 is an explanatory diagram for describing an n-pass public key authentication scheme.

Next, an n-pass public key authentication scheme will be described with reference to FIG. 2. FIG. 2 is an explanatory diagram for describing an n-pass public key authentication scheme.

As described above, the public key authentication scheme is an authentication scheme for proving to a verifier, in an interactive protocol, that a prover possesses a secret key sk corresponding to a public key pk. Moreover, to guarantee the security of the public key authentication scheme, two conditions, namely soundness and zero knowledge, have to be satisfied. Accordingly, as shown in FIG. 2, in the interactive protocol, information exchange is performed n times between the prover and the verifier while execution of processes is being performed by both prover and verifier.

In the case of the n-pass public key authentication scheme, a process is performed by the prover using the prover algorithm P (Step 1), and information $T_1$ is transmitted to the verifier. Next, a process is performed by the verifier using the verifier algorithm V (Step 2), and information $T_2$ is transmitted to the prover. Processes (Step 3) to (Step n) are performed in a similar manner and pieces of information $T_3, \ldots, T_n$ are transmitted, and a process (Step n+1) is performed. Such public key authentication scheme based on an interactive protocol where pieces of information are transmitted/received n times is called the "n-pass" public key authentication scheme.

In the foregoing, the n-pass public key authentication scheme has been described.

[1-3: Interactive Protocol of SSH10a Public Key Authentication Scheme]

Figure 3:
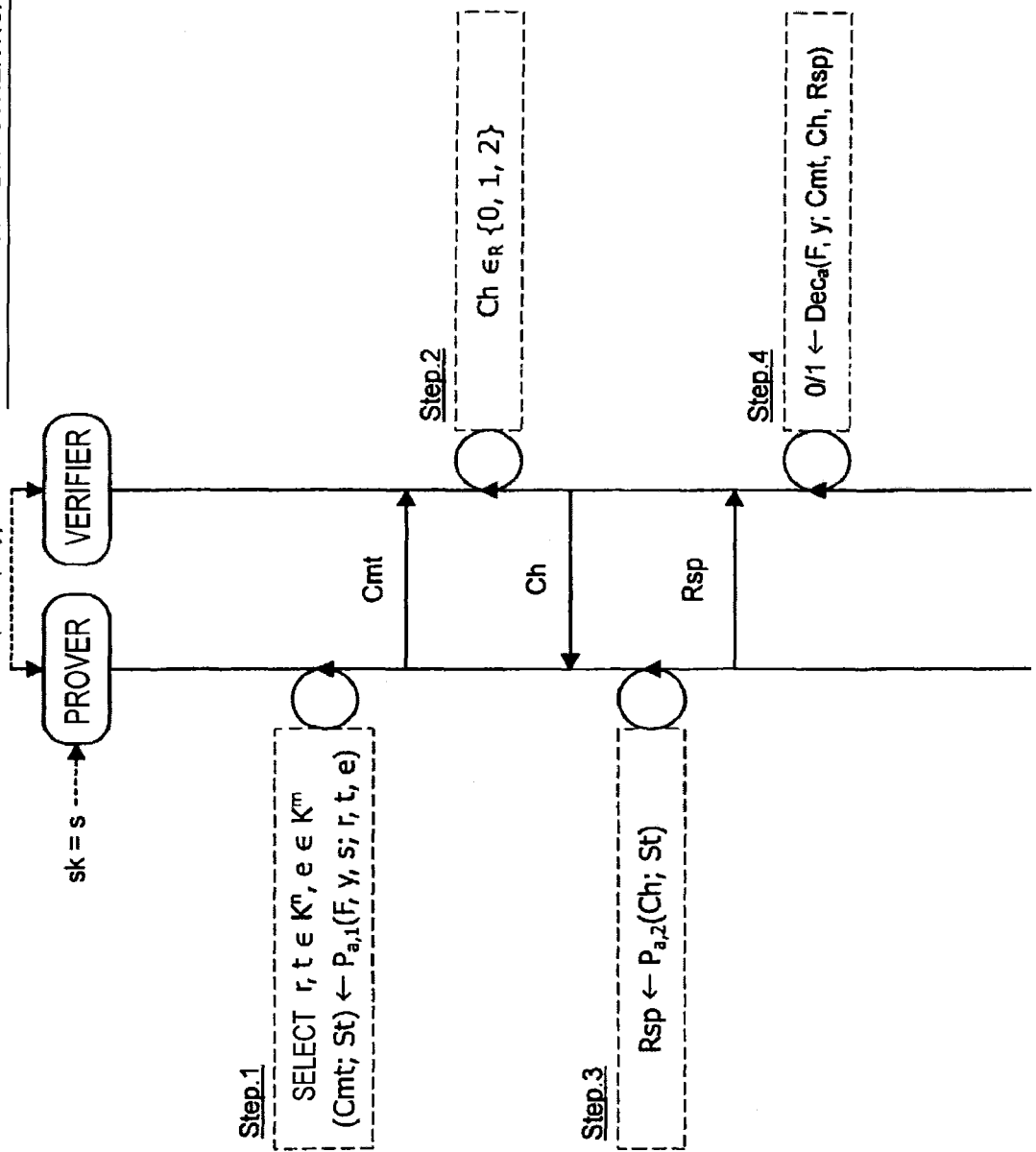
FIG. 3 is an explanatory diagram for describing an interactive protocol of an SSH10a public key authentication scheme.

Next, an interactive protocol of an SSH10a public key authentication scheme will be described with reference to FIG. 3. FIG. 3 is an explanatory diagram for describing an interactive protocol of an SSH10a public key authentication scheme. Additionally, an SSH10a public key authentication scheme is one of the public key authentication schemes devised by the present inventors (Sakumoto, Shirai, and Hiwatari) that are based on the problem of solving a multi-order multivariate simultaneous equation. Furthermore, this SSH10a public key authentication scheme is an example of a 3-pass public key authentication scheme.

Additionally, the problem of solving the multi-order multivariate simultaneous equation is a problem for obtaining a vector $(s_1, \ldots, s_n) \in K^n$ that satisfies $(f_1(s_1, \ldots, s_n), \ldots, f_m(s_1, \ldots, s_n)) = y$ when m multi-order polynomials of n variables $f_1(x_1, \ldots, x_n), \ldots, f_m(x_1, \ldots, x_n)$ on a ring K and a vector $y \in K^m$ are given. A problem of solving a multivariate simultaneous equation of second or higher order is called an NP-hard problem, and it belongs to a class of problems that are extremely difficult to solve.

Now, the interactive protocol of the SSH10a public key authentication scheme is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ to the public key pk, and sets s to the secret key. Additionally, in the following, a vector of n variables $(x_1, \ldots, x_n)$ will be expressed as x, and m second-order polynomials of n variables $(f_1(x), \ldots, f_m(x))$ will be expressed as $F(x)$.

(Prover Algorithm P, Verifier Algorithm V)

Next, structures of the prover algorithm P and the verifier algorithm V will be described with reference to FIG. 3. The interactive protocol of the SSH10a public key authentication scheme is for making a verifier prove that "prover knows the s that satisfies y=F(s)" without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

Here, reference will be made to the property of the second-order polynomial.

A set of m second-order polynomials of n variables $(f_1(x), \ldots, f_m(x))$ can be represented as formula (2) below. Moreover, $x=(x_1, \ldots, x_n)$ is a vector indicating n variables. Also, $A_1, \ldots, A_m$ are an n×n matrix. Also, $b_1, \ldots, b_m$ are an n×1 vector. Furthermore, c is an m×1 vector.

[Expressions 2]

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} + c \quad (2)$$

Using this representation, a set of polynomials F can be represented as formulae (3) and (4) below. That this representation holds can be easily confirmed from formula (5) below.

[Expression 3]

$$F(x_1 + x_2) = F(x_1) + F(x_2) + F_b(x_1, x_2) - c \quad (3)$$

$$F_b(x_1, x_2) = \begin{pmatrix} x_2^T (A_1^T + A_1) x_1 \\ \vdots \\ x_2^T (A_m^T + A_m) x_1 \end{pmatrix} \quad (4)$$

$$\begin{aligned}
f_l(x_1 + x_2) &= (x_1 + x_2)^T A_l (x_1 + x_2) + b_l^T (x_1 + x_2) + c_l \quad (5) \\
&= x_1^T A_l x_1 + x_1^T A_l x_2 + x_2^T A_l x_1 + x_2^T A_l x_2 + \\
&\quad b_l^T x_1 + b_l^T x_2 + c_l \\
&= f_l(x_1) + f_l(x_2) - c_l + x_1^T A_l x_2 + x_2^T A_l x_1 \\
&= f_l(x_1) + f_l(x_2) - c_l + x_1^T (A_l^T)^T x_2 + x_2^T A_l x_1 \\
&= f_l(x_1) + f_l(x_2) - c_l + (A_l^T x_1)^T x_2 + x_2^T A_l x_1 \\
&= f_l(x_1) + f_l(x_2) - c_l + x_2^T (A_l^T x_1) + x_2^T A_l x_1 \\
&= f_l(x_1) + x_2^T (A_l^T + A_l) x_1 + f_l(x_2) - c_l
\end{aligned}$$

When dividing $F(x_1+x_2)$ into three parts, i.e. a part dependent on $x_1$, a part dependent on $x_2$, and a part dependent on both $x_1$ and $x_2$, in this manner, the part $F_b(x_1, x_2)$ dependent on both $x_1$ and $x_2$ will be a bilinear map with respect to $x_1$ and $x_2$. Additionally, the SSH10a public key authentication scheme described below uses the property of the second-order polynomial as described above.

We will return to the explanation of the prover algorithm P and the verifier algorithm V of the interactive protocol of the SSH10a public key authentication scheme (see FIG. 3).

Step 1:

First, the prover algorithm P arbitrarily selects a number w. Then, the prover algorithm P applies generates a vector $r \in K^n$ and a number w' by applying the number w to a pseudo random number generator $G_1$. That is, the prover algorithm P calculates $(r, w') \leftarrow G_1(w)$. Next, the prover algorithm P generates two vectors $t \in K^n$ and $e \in K^m$ by applying the number w' to a pseudo random number generator $G_2$. That is, the prover algorithm P calculates $(t, e) \leftarrow G_2(w')$. Then, the prover algorithm P calculates $z \leftarrow s-r$. This calculation corresponds to an operation of masking the secret key s by the vector r. Furthermore, the prover algorithm P calculates $t' \leftarrow r+t$. Then, the prover algorithm P calculates $e' \leftarrow F(r)-c+e$.

Next, the prover algorithm P calculates $F_b(z, t)$ based on the definition of the function $F_b$ shown by the formulae (3) and (4), and generates a hash value $c_1$ of $F_b(z, t)+e$ and z. That is, the prover algorithm P calculates $c_1 \leftarrow H_1(F_b(z, t)+e, z)$. Furthermore, the prover algorithm P generates a hash value $c_2$ of the number w'. That is, the prover algorithm P calculates $c_2 \leftarrow H_2(w')$. Furthermore, the prover algorithm P generates a hash value $c_3$ of two vectors t' and e'. That is, the prover algorithm P calculates $c_3 \leftarrow H_3(t', e')$.

Next, the prover algorithm P sets $St \leftarrow (F, y, s, r, t, e, z, t', e')$ and $Cmt \leftarrow (c_1, c_2, c_3)$. Then, Cmt generated in Step 1 is sent to the verifier (verifier algorithm V). Additionally, $H_1(\ldots)$, $H_2(\ldots)$, and $H_3(\ldots)$ are hash functions. Furthermore, the operation of Step 1 will be expressed as $(Cmt; St) \leftarrow P_{a,1}(F, y, s; r, t, e)$.

Step 2:

The verifier algorithm V that received Cmt selects a verification pattern to be used from three verification patterns. Then, the verifier algorithm V sends to the prover (prover algorithm P) a challenge $Ch \in_R \{0, 1, 2\}$ indicating the selected verification pattern.

Step 3:

The prover algorithm P that received Ch generates a response Rsp to be sent back to the verifier algorithm V in response to the challenge Ch received from the verifier algorithm V. If Ch=0, the prover algorithm P generates a response $Rsp \leftarrow (r, t, e)$. Also, if Ch=1, the prover algorithm P generates a response $Rsp=(z, t, e)$. Furthermore, if Ch=2, the prover algorithm P generates a response $Rsp=(z, t', e')$. Additionally, the operation of Step 3 will be expressed as $Rsp \leftarrow P_{a,2}(Ch; St)$. Furthermore, the Rsp generated in Step 3 is sent to the verifier (verifier algorithm V).

Step 4:

The verifier algorithm V that received Rsp performs any of the following verifications for the Rsp that was received.

If Ch=0, the verifier algorithm V performs $(r'', t'', e'') \leftarrow Rsp$. Then, verifier algorithm V verifies whether $c_2=H_2(t'', e'')$ and $c_3=H_3(r''+t'', F(r'')-c+e'')$ hold true or not.

If Ch=1, the verifier algorithm V performs $(z'', t'', e'') \leftarrow Rsp$. Then, the verifier algorithm V verifies whether $c_1=H_1(F_b(z'', t'')+e'', z'')$ and $c_2=H_2(t'', e'')$ hold true or not.

If Ch=2, the verifier algorithm V performs (z", t''', e''')←Rsp. Then, the verifier algorithm V verifies whether $c_1=H_1(F(z")+F_b(z", t''')+e'''-y, z")$ and $c_3=H_3(t''', e''')$ hold true or not.

Additionally, the verification operation of Step 4 will be expressed as 0/1←$Dec_a$(F, y; Cmt, Ch, Rsp). In this operation, an output 1 indicates a verification success, and an output 0 indicates a verification failure.

In the foregoing, contents of processing by the prover algorithm P and the verifier algorithm V in the SSH10a public key authentication scheme have been described. Additionally, in the above scheme, $c_1$, $c_2$ and $c_3$ are calculated using the hash functions $H_1$, $H_2$ and $H_3$, but a commitment function COM may also be used instead of the hash functions $H_1$, $H_2$ and $H_3$. Furthermore, throughout this specification, the hash function may be replaced by the commitment function COM.

The commitment function COM is a function that takes as arguments a character string S and a random number ρ. Examples of the commitment function include a scheme presented by Shai Halevi and Silvio Micali at the International Conference CRYPTO 1996, and the like. In the case of using this commitment function, random numbers $ρ_1$, $ρ_2$ and $ρ_3$ are prepared before calculating $c_1$, $c_2$ and $c_3$, and $c_1$, $c_2$ and $c_3$ are generated by applying commitment functions COM(•, $ρ_1$), COM(•, $ρ_2$), and COM(•, $ρ_3$) instead of hash functions $H_1$(•), $H_2$(•), and $H_3$(•). Furthermore, $ρ_1$ is sent, included in the response, from the prover algorithm P to the verifier algorithm V.

[1-4: Interactive Protocol of SSH10b Public Key Authentication Scheme]

Next, an interactive protocol of an SSH10b public key authentication scheme will be described with reference to FIG. 4. FIG. 4 is an explanatory diagram for describing an interactive protocol of an SSH10b public key authentication scheme. Additionally, an SSH10b public key authentication scheme is one of the public key authentication schemes devised by the present inventors (Sakumoto, Shirai, and Hiwatari) that are based on the problem of solving a multi-order multivariate simultaneous equation. Furthermore, this SSH10b public key authentication scheme is an example of a 5-pass public key authentication scheme.

Similarly to the interactive protocol of the SSH10a public key authentication scheme, the interactive protocol of the SSH10b public key authentication scheme is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and a vector $s=(s_1, \ldots, s_n) \in K^n$. Next, the key generation algorithm Gen calculates $y=(y_1, \ldots, y_m) \leftarrow (f_1(s), \ldots, f_m(s))$. Then, the key generation algorithm Gen sets $(f_1, \ldots, f_m, y)$ to the public key pk, and sets s to the secret key. Additionally, in the following, a vector of n variables $(x_1, \ldots, x_n)$ will be expressed as x, and m second-order polynomials of n variables $(f_1(x), \ldots, f_m(x))$ will be expressed as F(x).

(Prover Algorithm P, Verifier Algorithm V)

Next, structures of the prover algorithm P and the verifier algorithm V will be described with reference to FIG. 4. The interactive protocol of the SSH10b public key authentication scheme is for making a verifier prove that "prover knows the s that satisfies y=F(s)" without leaking information on the s at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the SSH10b public key authentication scheme is configured from processing steps 1 to 6 shown in FIG. 4. In the following, the process of each step will be described.

Step 1:

First, the prover algorithm P arbitrarily selects a number w. Then, the prover algorithm P generates vectors $r \in K^n$, $t \in K^n$ and $e \in K^m$ by applying the number w to a pseudo random number generator G. That is, the prover algorithm P calculates $(r, t, e) \leftarrow G(w)$. Next, the prover algorithm P calculates z←s−r. This calculation corresponds to an operation of masking the secret key s by the vector r.

Next, the prover algorithm P generates a hash value $c_1$ of $F_b(z, t)+e$ and z. That is, the prover algorithm P calculates $c_1 \leftarrow H_1(F_b(z, t)+e, z)$. Furthermore, the prover algorithm P generates a hash value $c_2$ of the vectors r, t and e. That is, the prover algorithm P calculates $c_2 \leftarrow H_2(r, t, e)$. Additionally, $H_1( \ldots )$ and $H_2( \ldots )$ are hash functions.

Next, the prover algorithm P sets $St_A \leftarrow (F, y, s, r, t, e, z)$ and $Cmt_A \leftarrow (c_1, c_2)$. Then, $Cmt_A$ generated in Step 1 is sent to the verifier (verifier algorithm V). Additionally, $H_1( \ldots )$ and $H_2( \ldots )$ are hash functions. Furthermore, the operation of Step 1 will be expressed as $(Cmt_A; St_A) \leftarrow P_{b,1}(F, y, s; r, t, e)$.

Step 2:

The verifier algorithm V that received $Cmt_A$ selects one random number α from q types of elements of a ring K. Then, the verifier algorithm V sends a challenge $Ch_A=α$ to the prover (prover algorithm P).

Step 3:

The prover algorithm P that received $Ch_A$ calculates t'←αr+t. Furthermore, the prover algorithm P calculates e'←α(F(r)c)+e. Then, the prover algorithm P sets $St_B \leftarrow (St_A, Ch_A, t', e')$ and $Cmt_B \leftarrow (t', e')$. Furthermore, the prover algorithm P sends $Cmt_B$ to the verifier (verifier algorithm V). Additionally, the operation of Step 3 will be expressed as $(Cmt_B; St_B) \leftarrow P_{b,2}(Ch_A; St_A)$.

Step 4:

The verifier algorithm V that received $Cmt_B$ selects a verification pattern to be used from two verification patterns. Then, the verifier algorithm V sends to the prover (prover algorithm P) a challenge $Ch_B \in_R \{0, 1\}$ indicating the selected verification pattern.

Step 5:

The prover algorithm P that received $Ch_B$ generates a response Rsp to be sent back to the verifier (verifier algorithm V) in response to the challenge $Ch_B$ received from the verifier algorithm V in the following manner. If $Ch_B=0$, the prover algorithm P sets to Rsp←r. If $Ch_B=1$, the prover algorithm P sets to Rsp←z. Then, the prover algorithm P sends the response Rsp to the verifier (verifier algorithm V). Additionally, the operation of Step 5 will be expressed as $Rsp \leftarrow P_{b,3}(Ch_B; St_B)$.

Step 6:

The verifier algorithm V that received the response Rsp performs the following verification processes using the response Rsp received from the prover (prover algorithm P).

If $Ch_B=0$, the verifier algorithm V takes r"←Rsp and verifies whether $c_2=H_2(r", t'-αr", e'-α(F(r")-c))$ holds true or not.

If $Ch_B=1$, the verifier algorithm V takes z"←Rsp and verifies whether $c_1=H_1(α(F(z")-y)+F_b(z", t')+e', z")$ holds true or not.

Additionally, the verification operation of Step 6 will be expressed as $0/1 \leftarrow \text{Dec}_b(F, y; \text{Cmt}_A, \text{Ch}_A, \text{Cmt}_B, \text{Ch}_B, \text{Rsp})$. In this operation, an output 1 indicates a verification success, and an output 0 indicates a verification failure.

In the foregoing, contents of processing by the prover algorithm P and the verifier algorithm V in the SSH10b public key authentication scheme have been described. Additionally, in the above scheme, $c_1$ and $c_2$ are calculated using the hash functions $H_1$ and $H_2$, but the commitment function COM may also be used instead of the hash functions $H_1$ and $H_2$.

[1-5: Repetition Configuration of Interactive Protocol]

Now, when adopting the interactive protocol of the SSH10a public key authentication scheme described above, the probability of falsification succeeding can be suppressed to ⅔ or less. Accordingly, if this interactive protocol is performed twice, the probability of falsification succeeding can be suppressed to $(⅔)^2$ or less. In the same manner, if this interactive protocol is performed N times, the probability of falsification succeeding becomes $(⅔)^N$, and if N is a sufficiently large number (for example, N=140), the probability of falsification succeeding is reduced to a negligible level.

Similarly, when adopting the interactive protocol of the SSH10b public key authentication scheme described above, the probability of falsification succeeding can be suppressed to (½+½q) or less. Accordingly, if this interactive protocol is performed twice, the probability of falsification succeeding can be suppressed to $(½+½q)^2$ or less. In the same manner, if this interactive protocol is performed N times, the probability of falsification succeeding becomes $(½+½q)^N$, and if N is a sufficiently large number (for example, N=80), the probability of falsification succeeding is reduced to a negligible level.

Additionally, not only for the SSH10a public key authentication scheme and the SSH10b public key authentication scheme, but also for the public key authentication schemes disclosed in the non-patent literatures 1 to 3 mentioned above, when the interactive protocol is performed once and the probability of falsification success is not sufficiently small, the probability of falsification success has to be reduced by repeatedly performing the interactive protocol. As a method of repeatedly performing the interactive protocol, there are a serial-repetition configuration shown in FIG. 5 and a parallel-repetition configuration shown in FIG. 6.

The serial-repetition configuration is a method of sequentially performing the interactive protocol as shown in FIG. 5, where the interactive protocol is performed once, and when the first round is completed, the second round is performed, and when the second round is completed, the third round is performed. On the other hand, the parallel-repetition configuration is a method of simultaneously transmitting messages for N rounds at each pass as shown in FIG. 6, where first-pass messages $m_{1,1}, \ldots, m_{N,1}$ for N rounds are simultaneously transmitted, and then second-pass messages $m_{1,2}, \ldots, m_{N,2}$ for the N rounds are simultaneously transmitted, and then third-pass messages $m_{1,3}, \ldots, m_{N,3}$ for the N rounds are simultaneously transmitted.

Now, the public key authentication schemes disclosed in the non-patent literatures 1 to 3 mentioned above, the SSH10a public key authentication scheme and the SSH10b public key authentication scheme guarantee a security level sufficient for a passive attack. However, with these public key authentication schemes, it was not known whether a security level sufficient for an active attack was absolutely guaranteed or not in the case the parallel-repetition configuration was adopted. These public key authentication scheme were schemes where a prover proved to a verifier that "the prover knows the s that satisfies y=F(s) for y" by using one key pair (public key y, secret key s).

Accordingly, if interaction that will be accepted by verification was performed, it was not possible to prevent the verifier from knowing the information that "the prover who performed the interaction used the s." Furthermore, collision resistance is not guaranteed for the F that is used in these schemes. As a result, with these public key authentication schemes, it was not known whether a security level sufficient for an active attack was absolutely guaranteed or not in the case the parallel-repetition configuration was adopted. Particularly, in the case of performing these public key authentication schemes using the parallel-repetition configuration described above, no method was known for guaranteeing the security level sufficient for an active attack.

Accordingly, the present inventors have devised mechanisms of guaranteeing the security level sufficient for an active attack at the time of performing these public key authentication scheme using the parallel-repetition configuration. These mechanisms (present method #1, present method #2) will be described later in detail taking the SSH10a public key authentication scheme and the SSH10b public key authentication scheme as examples.

[1-6: Falsification Algorithm Against SSH10a Public Key Authentication Scheme]

Here, consideration will be given, with reference to FIG. 7, to a falsification algorithm that succeeds with a probability of ⅔ in the SSH10a public key authentication scheme (one interactive protocol). FIG. 7 is an explanatory diagram for describing a falsification algorithm that succeeds with a probability of ⅔ in the SSH10a public key authentication scheme (one interactive protocol). This falsification algorithm is an algorithm where a falsifier "pretends that he knows the s that satisfies y=F(s)" to a verifier. However, even if this falsification algorithm is adopted, falsification will fail with a probability of ⅓.

Step 1:

First, a falsifier (falsification algorithm) generates vectors $s, r, t \in K^n$ and $e \in K^m$. Next, the falsification algorithm arbitrarily selects $\text{Ch}^* \in \{0, 1, 2\}$. This Ch* corresponds to a verification pattern where the falsification algorithm is not able to give a response. Additionally, the s used here is not a legitimate secret key. However, with a verification pattern other than the Ch*, a prover (prover algorithm P) can give a correct response without using a legitimate secret key.

Next, the falsification algorithm calculates $z \leftarrow s-r$ and $t' \leftarrow r+t$. Furthermore, if Ch*=0, the falsification algorithm calculates $e' \leftarrow y-F(s)+F(r)-c+e$. On the other hand, if Ch*=1 or 2, the falsification algorithm calculates $e' \leftarrow F(r)-c+e$. Then, if Ch*=0 or 2, the falsification algorithm calculates $c_1 \leftarrow H_1(F_b(z, t)+e, z)$. On the other hand, if Ch*=1, the falsification algorithm calculates $c_1 \leftarrow H_1(F(z)+F_b(z, t')+e'-y, z)$.

Next, the falsification algorithm calculates $c_2 \leftarrow H_2(t, e)$ and $c_3 \leftarrow H_3(t', e')$. Then, the falsification algorithm sets $\text{St} \leftarrow (\text{Ch}^*, F, y, s, r, t, e, z, t', e')$ and $\text{Cmt} \leftarrow (c_1, c_2, c_3)$. Next, the falsification algorithm sends Cmt to a verifier (verifier algorithm V). Additionally, the operation of Step 1 will be expressed as $(\text{Cmt}; \text{St}) \leftarrow M_{a,1}(F, y; \text{Ch}^*, s, r, t, e)$.

Step 2:

The verifier algorithm V that received Cmt selects a verification pattern to be used from three verification patterns. Then, the verifier algorithm V sends to the falsifier (falsification algorithm) a challenge $\text{Ch} \in_R \{0, 1, 2\}$ indicating the selected verification pattern.

Step 3:

The falsification algorithm that received Ch generates a response Rsp to be sent back to the verifier algorithm V in response to the challenge Ch received from the verifier algorithm V. Additionally, if Ch=Ch*, the falsification algorithm outputs an error and ends the interactive protocol. If Ch≠Ch* and Ch=0, the falsification algorithm generates a response Rsp←(r, t, e). Also, if Ch=1, the falsification algorithm generates a response Rsp=(z, t, e). Furthermore, if Ch=2, the falsification algorithm generates a response Rsp=(z, t', e').

Additionally, the operation of Step 3 will be expressed as Rsp←$M_{a,2}$(Ch; St). Furthermore, the Rsp generated in Step 3 is sent to the verifier (verifier algorithm V).

Step 4:

If Ch≠Ch*, since the response Rsp is sent to the verifier algorithm V, a verification process 0/1←$Dec_a$(F, y; Cmt, Ch, Rsp) is performed by the verifier algorithm V.

In the foregoing, a falsification algorithm against the SSH10a public key authentication scheme has been described. As described, even if the s is arbitrarily selected, a Rsp which will pass verification with a probability of ⅔ (probability of Ch≠Ch*) can be sent back to the verifier. Therefore, falsification will succeed with a probability of ⅔ in a one interactive protocol. Thus, the repetition configuration described above will be adopted.

[1-7: Falsification Algorithm Against SSH10b Public Key Authentication Scheme]

Next, consideration will be given, with reference to FIG. 8, to a falsification algorithm that succeeds with a probability of ½ in the SSH10b public key authentication scheme (one interactive protocol). FIG. 8 is an explanatory diagram for describing a falsification algorithm that succeeds with a probability of ½ in the SSH10b public key authentication scheme (one interactive protocol). This falsification algorithm is an algorithm where a falsifier "pretends that he knows the s that satisfies y=F(s)" to a verifier. However, even if this falsification algorithm is adopted, falsification will fail with a probability of ½.

Step 1:

First, a falsifier (falsification algorithm) generates vectors s,r,t∈$K^n$ and e∈$K^m$. Next, the falsification algorithm arbitrarily selects Ch*$_B$∈{0, 1}. This Ch*$_B$ corresponds to a verification pattern where the falsification algorithm is not able to provide a response with respect to the group of $i_0$. Additionally, the $s_{i0}$ used here is not a legitimate secret key, but the falsification algorithm can give a correct response without using a legitimate secret key with respect to a verification pattern other than the Ch*$_B$.

Next, the falsification algorithm calculates z←s−r. Then, the falsification algorithm calculates $c_1$←$H_1$($F_b$(z, t)+e, z) and $c_2$←$H_2$(r, t, e). Then, the falsification algorithm sets $St_A$←(F, y, Ch*$_B$, s, r, t, e, z) and $Cmt_A$←($c_1$, $c_2$). Then, $Cmt_A$ generated in Step 1 is sent to a verifier (verifier algorithm V). Additionally, $H_1$( . . . ) and $H_2$( . . . ) are hash functions. Furthermore, the operation of Step 1 will be expressed as ($Cmt_A$; $St_A$)←$M_{b,1}$(F, y; Ch*$_B$, s, r, t, e).

Step 2:

The verifier algorithm V that received $Cmt_A$ selects a random number α from q types of elements of a ring K. Then, the verifier algorithm V sends a challenge $Ch_A$=α to the falsifier (falsification algorithm).

Step 3:

The falsification algorithm that received $Ch_A$ calculates t'←αr+t. Furthermore, if Ch*$_B$=1, the falsification algorithm calculates e'←α(F(r)−c)+e. On the other hand, if Ch*$_B$=0, the falsification algorithm calculates e'←α(y−F(s)+F(r)−c)+ e. Then, the falsification algorithm sets $St_B$←($St_A$, $Ch_A$, t', e') and $Cmt_B$←(t', e'). Furthermore, the falsification algorithm sends $Cmt_B$ to the verifier (verifier algorithm V). Additionally, the operation of Step 3 will be expressed as ($Cmt_B$; $St_B$)←$M_{b,2}$($Ch_A$; $St_A$).

Step 4:

The verifier algorithm V that received $Cmt_B$ selects a verification pattern to be used from two verification patterns. Then, the verifier algorithm V sends to the falsifier (falsification algorithm) a challenge $Ch_B$∈$_R${0, 1} indicating the selected verification pattern.

Step 5:

If $Ch_B$=Ch*$_B$, the falsification algorithm that received $Ch_B$ outputs an error and ends the interactive protocol. If $Ch_B$≠Ch*$_B$, the falsification algorithm generates a response Rsp to be sent back to the verifier (verifier algorithm V) in response to the challenge $Ch_B$ received from the verifier algorithm V in the following manner.

If $Ch_B$=0, the falsification algorithm sets to Rsp←r. If $Ch_B$=1, the falsification algorithm sets to Rsp←z. Then, the falsification algorithm sends the response Rsp to the verifier (verifier algorithm V). Additionally, the operation of Step 5 will be expressed as Rsp←$M_{b,3}$($Ch_B$; $St_B$).

Step 6:

If $Ch_B$≠Ch*$_B$, since the response Rsp is sent to the verifier algorithm V, a verification process 0/1←$Dec_b$(F, y; $Cmt_A$, $Ch_A$, $Cmt_B$, $Ch_B$, Rsp) is performed by the verifier algorithm V.

In the foregoing, a falsification algorithm against the SSH10b public key authentication scheme has been described. As described, even if the s is arbitrarily selected, a Rsp which will pass verification with a probability of ½ (probability of $Ch_B$≠Ch*$_B$) can be sent back to the verifier. Therefore, falsification will succeed with a probability of ½ in one interactive protocol. Thus, the repetition configuration described above will be adopted.

(Supplement)

In the foregoing, the SSH10a public key authentication scheme, the SSH10b public key authentication scheme, their falsification algorithms, and the repetition configurations of the interactive protocols have been described. These public key authentication schemes are schemes where a prover proves to a verifier that "the prover knows the s that satisfies y=F(s) for y" by using one key pair (public key y, secret key s). Accordingly, if interaction that will be accepted by verification was performed, it was not possible to prevent the verifier from knowing the information that "the prover who performed the verification used the s." Furthermore, collision resistance is not guaranteed for the F used in these schemes. As a result, it was not known whether or not these public key authentication schemes absolutely guaranteed the security level sufficient for an active attack in a case the parallel-repetition configuration was adopted.

Accordingly, the present inventors have devised a mechanism of guaranteeing a security level sufficient for an active attack at the time of performing these public key authentication schemes while adopting the parallel-repetition configuration. In the following, this mechanism will be described in detail with citation to concrete examples.

2: First Embodiment

Present Method #1

First, a first embodiment (hereinafter, present method #1) of the present disclosure will be described.

2-1: Overview

The present method #1 applies to the SSH10a public key authentication scheme and the SSH10b public key authentication scheme a mechanism of guaranteeing a security level sufficient for an active attack also in the case of adopting the parallel-repetition configuration. As has been described, the reason why it was not known whether the security level sufficient for an active attack was guaranteed or not is because collision resistance was not guaranteed for the function F to be used and also because it was not possible to prevent a verifier from knowing the information that "the prover who performed the verification used the s." Therefore, if the verifier can be prevented from knowing the information that "the prover who performed the verification used the s" in the interactive protocol, the security level sufficient for an active attack can be guaranteed.

Accordingly, the present inventors have devised a method of causing the secret key s and the public key y to be multiplexed keys. This method takes L (L≥2) $s_1, \ldots, s_L \in K^n$ as a secret key and takes $y_1, \ldots, y_L \in K^m$ that satisfies $(y_1, \ldots, y_L) = (F(s_1), \ldots, F(s_L))$ for m multi-order polynomials of n variables $F(x) = (f_1(x), \ldots, f_m(x))$ as a public key. Furthermore, this method is a method of proving "knowledge of the $s_i$ that satisfies $y_i = F(s_i)$ with respect to L−1 i's among i=1, ..., L" without letting know which $s_i$ was used in the interactive protocol. When applying this method, information related to "which $s_i$ was used" in the interactive protocol will not be leaked, and the security level sufficient for an active attack will be guaranteed.

According to the scheme of the present method #1, a verifier sends to a prover challenges $Ch_1, \ldots, Ch_L$ (verification patterns) with respect to i=1, ..., L and the prover that has received the challenges $Ch_1, \ldots, Ch_L$ selects L−1 challenges $Ch_i$ and gives a response. When using this method, the prover who know $s_1, \ldots, s_L$ can respond to all the L challenges $Ch_i$ but falsification by a falsifier who does not know $s_1, \ldots, s_L$ will fail with a certain probability. Furthermore, since the prover has to respond only to L−1 challenges $Ch_i$, authentication can be established without using the $s_i$ for a certain challenge $Ch_i$. That is, it is not known to the verifier whether or not a certain $s_i$ was used in the interactive protocol.

2-2: Application to SSH10a Public Key Authentication Scheme

First, an interactive protocol of a case where the scheme of the present method #1 is applied to the SSH10a public key authentication scheme will be described. FIG. 9 is an explanatory diagram for describing an interactive protocol of a case where the scheme of the present method #1 is applied to the SSH10a public key authentication scheme. This interactive protocol is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and L vectors $s_1, \ldots, s_L \in K^n$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1 = F(s_1), \ldots, y_L = F(s_L)$. Then, the key generation algorithm Gen sets $(F, y_1, \ldots, y_L)$ to the public key pk, and sets $(s_1, \ldots, s_L)$ to the secret key.

(Prover Algorithm P, Verifier Algorithm V)

Next, structures of the prover algorithm P and the verifier algorithm V will be described with reference to FIG. 9. The interactive protocol of the present scheme #1 is for making a verifier prove that "prover knows the $s_i$ that satisfies L−1 pieces of $y_i = F(s_i)$" without leaking information on "which $s_i$ was used or was not used" at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #1 is configured from processing steps 1 to 4 shown in FIG. 9. In the following, the process of each step will be described.

Step 1:

First, the prover algorithm P generates a vector $r_i, t_i \in K^n$ and a vector $e_i \in K^m$ for i=1, ..., L. Next, the prover algorithm P calculates $(Cmt_i; St_i) \leftarrow P_{a,1}(F, y_i, s_i; r_i, t_i, e_i)$. Then, the prover algorithm P sends $Cmt_1, \ldots, Cmt_L$ to the verifier (verifier algorithm V).

Step 2:

The verifier algorithm V that received $Cmt_1, \ldots, Cmt_L$ selects a verification pattern to be used from three verification patterns. Then, the verifier algorithm V sends to the prover (prover algorithm P) challenges $Ch_1, \ldots, Ch_L \in_R \{0, 1, 2\}$ indicating the selected verification pattern.

Step 3:

The prover algorithm P that received $Ch_1, \ldots, Ch_L$ randomly selects, from i=1, ..., L, one index i (hereinafter, i*) of a challenge $Ch_i$ to which a response will not be given. Next, the prover algorithm P calculates $Rsp_i \leftarrow P_{a,2}(Ch_i; St_i)$ with respect to $i \in \{1, \ldots, L\} \setminus \{i^*\}$. Then, the prover algorithm P sends $(Rsp_1, \ldots, Rsp_{i^*-1}, Rsp_{i^*+1}, \ldots, Rsp_L, i^*)$ to the verifier (verifier algorithm V).

Step 4:

The verifier algorithm V that received $(Rsp_1, \ldots, Rsp_{i^*-1}, Rsp_{i^*+i}, Rsp_L, i^*)$ performs $0/1 \leftarrow Dec_a(F, y_i; Cmt_i, Ch_i, Rsp_i)$ with respect to $i \in \{1, \ldots, L\} \setminus \{i^*\}$. Then, in a case of acceptance (output 1) for all of $i \in \{1, \ldots, L\} \setminus \{i\}$, the verifier algorithm V assumes that verification is established.

In the foregoing, an interactive protocol of a case where the scheme of the present method #1 is applied to the SSH10a public key authentication scheme has been described. It is guaranteed for this interactive protocol that, owing to the security of the SSH10a public key authentication scheme, a falsifier not having the $s_i$ is able to correctly respond, with respect to each i=1, ..., L, to the challenge $Ch_i$ sent from the verifier with a probability of only ⅔ or less. Furthermore, by applying the present method #1, since it becomes necessary to correctly respond to the challenge $Ch_i$ sent from the verifier with respect to L−1 or more i's, the probability of success of falsification will be $(⅔)^L + L(⅓)(⅔)^{L-1} = (2+L)2^{L-1}/3^L$.

Furthermore, in the interactive protocol described above, all of $s_1, \ldots, s_L$ are used, but if L≤3, it is possible, when the $s_i$ was not used for one of i=1, ..., L, to behave exactly like the prover without letting know the verifier which $s_i$ was not used. Accordingly, interactive protocols (modified examples 1 to 3) capable of realizing the same authentication as the above-described interactive protocol without using one $s_i$ will be described.

2-3: Application to SSH10a Public Key Authentication Scheme

Modified Example 1

First, an interactive protocol (modified example 1) of a case where the scheme of the present method #1 is applied to the SSH10a public key authentication scheme will be described with reference to FIG. 10. FIG. 10 is an explanatory diagram for describing an interactive protocol (modified example 1) of a case where the scheme of the present method #1 is applied to the SSH10a public key authentication scheme. This interactive protocol is configured from a key generation algorithm Gen, a prover algorithm P and a verifier algorithm V. Incidentally, the structure of the falsification algorithm described above is used in the verifier algorithm V. Furthermore, explanation will be given for a case of L=3. Furthermore, the index of $s_i$ that is not used will be made $i_0$. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and L vectors $s_1, \ldots, s_L \in K^n$. Incidentally, a vector which is selected as appropriate is used as $s_{i0}$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1 = F(s_1), \ldots, y_L = F(s_L)$. Additionally, $y_{i0} = F(s_{i0})$ does not have to be guaranteed. Then, the key generation algorithm Gen sets $(F, y_1, \ldots, y_L)$ to the public key pk, and sets $(s_1, \ldots, s_L)$ to the secret key.

(Prover Algorithm P, Verifier Algorithm V)

Next, structures of the prover algorithm P and the verifier algorithm V will be described with reference to FIG. 10. Additionally, the public key pk generated by the key generation algorithm Gen is assumed to be shared between a prover and a verifier. Also, the secret key sk generated by the key generation algorithm Gen is assumed to be secretly managed by the prover.

The interactive protocol of the present scheme #1 is configured from processing steps 1 to 4 shown in FIG. 10. In the following, the process of each step will be described.

Step 1:

First, the prover algorithm P generates a vector $r_i, t_i \in K^n$ and a vector $e_i \in K^m$ for i=1, 2, 3. Next, the prover algorithm P selects one $Ch^* \in \{0, 1, 2\}$. This $Ch^*$ corresponds to a verification pattern where the prover is not able to give a response with respect to the group of $i_0$. Next, if $i \neq i_0$, the prover algorithm P calculates $(Cmt_i; St_i) \leftarrow P_{a,1}(F, y_i, s_i; r_i, t_i, e_i)$. On the other hand, if $i = i_0$, the prover algorithm P calculates $(Cmt_i; St_i) \leftarrow M_{a,1}(F, y_i; Ch^*, s_i, r_i, t_i, e_i)$. Then, the prover algorithm P sends $Cmt_1$, $Cmt_2$ and $Cmt_3$ to the verifier (verifier algorithm V).

Step 2:

The verifier algorithm V that received $Cmt_1$, $Cmt_2$ and $Cmt_3$ selects a verification pattern to be used from three verification patterns. Then, the verifier algorithm V sends to the prover (prover algorithm P) challenges $Ch_1, Ch_2, Ch_3 \in_R \{0, 1, 2\}$ indicating the selected verification pattern.

Step 3:

The prover algorithm P that received $Ch_1$, $Ch_2$ and $Ch_3$ selects the index i (hereinafter, $i^*$) of one challenge $Ch_i$ to which a response will not be given from i=1, \ldots, L in the following manner. If $Ch_{i0} = Ch^*$, the prover algorithm V sets $i^* \leftarrow i_0$. On the other hand, if $Ch_{i0} \neq Ch^*$, the prover algorithm V randomly selects the $i^*$ from $i^* \in \{1,2,3\} \yen \{i_0\}$. If this method of setting the $i^*$ is used, then no matter which verification pattern is requested by the verifier, the $i^*$ will take any of values 1, 2 and 3 with a probability of ⅓, respectively. That is, information indicating the value that 0.4) took among 1, 2 and 3 is completely hidden.

Next, the prover algorithm P calculates $Rsp_i$ with respect to $i \in \{1,2,3\} \yen \{i^*\}$ in the following manner. If $i \neq i_0$, the prover algorithm P calculates $Rsp_i \leftarrow P_{a,2}(Ch_i; St_i)$. If $i = i_0$, the prover algorithm P calculates $Rsp_i \leftarrow M_{a,2}(Ch_i; St_i)$. Then, the prover algorithm P sends $(Rsp_1, \ldots, Rsp_{i^*-1}, Rsp_{i^*+i}, \ldots, Rsp_L, i^*)$ to the verifier (verifier algorithm V).

Step 4:

The verifier algorithm V that received $(Rsp_1, \ldots, Rsp_{i^*-1}, Rsp_{i^*+i}, \ldots, Rsp_L, i^*)$ performs $0/1 \leftarrow Dec_a(F, y_i; Cmt_i, Ch_i, Rsp_i)$ with respect to $i \in \{1,2,3\} \yen \{i^*\}$. Then, in a case of acceptance (output 1) for all of $i \in \{1,2,3\} \yen \{i^*\}$, the verifier algorithm V assumes that verification is established.

In the foregoing, an interactive protocol (modified example) of a case where the scheme of the present method #1 is applied to the SSH10a public key authentication scheme has been described. Explanation was given taking the case of L=3, but the same can be said for the case of L=2. For example, one i ($i^*$) that will not be used will be set from i=1, 2 in the following manner. If $Ch_{i0} = Ch^*$, $i^* = i_0$ will be set. On the other hand, if $Ch_{i0} \neq Ch^*$, $i^* = i_0$ with a probability of ¼ and $i^* \neq i_0$ will be set with a probability of ¾. With such setting, no matter which verification pattern is requested by the verifier, the $i^*$ will take either of values 1 and 2 with a probability of ½, respectively. Accordingly, the information indicating the value that 0.4) took among 1 and 2 is completely hidden.

2-4: Application to SSH10a Public Key Authentication Scheme

Modified Example 2

Next, an interactive protocol (modified example 2) of a case where the scheme of the present method #1 is applied to the SSH10a public key authentication scheme will be described with reference to FIG. 11. Additionally, the modified example 2 is a modified example of the interactive protocol shown in FIG. 9. FIG. 11 is an explanatory diagram for describing an interactive protocol (modified example 2) of a case where the scheme of the present method #1 is applied to the SSH10a public key authentication scheme. This interactive protocol is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n) \ldots, f_m(x_1, \ldots, x_n)$ defined on a ring K and two vectors $s_1, s_2 \in K^n$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1 = F(s_1)$ and $y_2 = F(s_2)$. Then, the key generation algorithm Gen sets $(F, y_1, y_2)$ to the public key pk, and sets $(s_1, s_2)$ to the secret key.

(Prover Algorithm P, Verifier Algorithm V)

Next, structures of the prover algorithm P and the verifier algorithm V will be described with reference to FIG. 11. The interactive protocol of the present scheme #1 is for making a verifier prove that "the prover knows the $s_i$ that satisfies one $y_i=F(s_i)$" without leaking information on "which $s_i$ was used or was not used" at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #1 is configured from processing steps 1 to 4 shown in FIG. 11. In the following, the process of each step will be described.

Step 1:

First, the prover algorithm P generates a vector $r_1, t_1 \in K^n$ and a vector $e_1 \in K^m$. Next, the prover algorithm P calculates $(Cmt_1; St_1) \leftarrow P_{a,1}(F, y_1, s_1; r_1, t_1, e_1)$ and $(Cmt_2; St_2) \leftarrow P_{a,1}(F, y_2, s_2; r_1, t_1, e_1)$. Additionally, $Cmt_1$ is $(c_{11}, c_{12}, c_{13})$ and $Cmt_2$ is $(c_{21}, c_{12}, c_{13})$. Then, the prover algorithm P sends $c_{11}, c_{12}, c_{13}$ and $c_{21}$ to the verifier (verifier algorithm V).

Step 2:

The verifier algorithm V that received $c_{11}, c_{12}, c_{13}$ and $c_{21}$ selects a verification pattern to be used. Then, the verifier algorithm V sends to the prover (prover algorithm P) a set of challenges $(Ch_1, Ch_2) \in \{0, 1, 2\} \times \{0, 1, 2\}$ indicating the selected verification pattern.

Step 3:

The prover algorithm P that received $Ch_1$ and $Ch_e$ randomly selects an index i of a challenge $Ch_i$ to which a response is to be given. Next, prover algorithm P calculates $Rsp_i \leftarrow P_{a,2}(Ch_i; St_i, r_1, t_1, e_1)$ for the selected i. Then, prover algorithm P sends $(Rsp_i, i)$ to the verifier (verifier algorithm V).

Step 4:

The verifier algorithm V that received $Rsp_i$, i performs $0/1 \leftarrow Dec_a(F, y_i; (c_{i1},c_{12},c_{13}), Ch_i, Rsp_i)$. Then, in a case the output is 1 (in a case of acceptance), the verifier algorithm V assumes that verification is established.

In the foregoing, the interactive protocol (modified example 2) of a case where the scheme of the present method #1 is applied to the SSH10a public key authentication scheme has been described. The present modified example has its characteristic in that sets of random numbers $(r_1, t_1, e_1)$ and $(r_2, t_2, e_2)$ used at the time of generating $Cmt_1$, $St_1$, $Cmt_2$ and $St_2$ are made common. By making these random numbers common, $(c_{12}, c_{13})$ and $(c_{22}, c_{23})$ among elements forming $Cmt_1=(c_{11},c_{12},c_{13})$ and $Cmt_2=(c_{21},c_{22},c_{23})$ will be common values. Thus, only four values $(c_{11}, c_{12}, c_{13}, c_{21})$ will have to be sent at the time of sending $Cmt_1$ and $Cmt_2$ from the prover to the verifier, and the amount of communication can be reduced. Additionally, in the case of the present modified example, only the information related to one of the groups will be published in the third pass, and thus the zero knowledge will not be lost even if a part of the random numbers is made common as described above.

2-5: Application to SSH10a Public Key Authentication Scheme

Modified Example 3

Next, an interactive protocol (modified example 3) of a case where the scheme of the present method #1 is applied to the SSH10a public key authentication scheme will be described with reference to FIG. 12. Additionally, the modified example 3 is a modified example of the interactive protocol (modified example 2) shown in FIG. 11. FIG. 12 is an explanatory diagram for describing an interactive protocol (modified example 3) of a case where the scheme of the present method #1 is applied to the SSH10a public key authentication scheme. This interactive protocol is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and two vectors $s_1, s_2 \in K^n$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1=F(s_1)$ and $y_2=F(s_2)$. Then, the key generation algorithm Gen sets $(F, y_1, y_2)$ to a public key pk, and sets $(s_1, s_2)$ to a secret key.

(Prover Algorithm P, Verifier Algorithm V)

Next, structures of the prover algorithm P and the verifier algorithm V will be described with reference to FIG. 12. The interactive protocol of the present scheme #1 is for making a verifier prove that "prover knows the $s_i$ that satisfies one $y_i=F(s_i)$" without leaking information on "which $s_i$ was used or was not used" at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #1 is configured from processing steps 1 to 4 shown in FIG. 12. In the following, the process of each step will be described.

Step 1:

First, the prover algorithm P generates a vector $r_1, t_1 \in K^n$ and a vector $e_1 \in K^m$. Next, the prover algorithm P calculates $(Cmt_1; St_1) \leftarrow P_{a,1}(F, y_1, s_1; r_1, t_1, e_1)$ and $(Cmt_2; St_2) \leftarrow P_{a,1}(F, y_2, s_2; r_1, t_1, e_1)$. Incidentally, $Cmt_1$ is $(c_{11},c_{12},c_{13})$ and $Cmt_2$ is $(c_{21},c_{12},c_{13})$. Next, the prover algorithm P sends $c_{11}, c_{12}, c_{13}$ and $c_{21}$ to the verifier (verifier algorithm V).

Step 2:

The verifier algorithm V that received $c_{11}, c_{12}, c_{13}$ and $c_{21}$ selects a verification pattern to be used. At this time, the verifier algorithm V selects a verification pattern (a set of challenges $(Ch_1, Ch_2)$) from $(Ch_1, Ch_2) \in \{(0,0),(1,1),(1,2),(2,1),(2,2)\}$. Then, the verifier algorithm V sends to the prover (prover algorithm P) the set of challenges $(Ch_1, Ch_2)$ indicating the selected verification pattern.

Step 3:

The prover algorithm P that received $Ch_1$ and $Ch_2$ randomly selects an index i of a challenge $Ch_i$ to which a response is to be given. Next, the prover algorithm P calculates $Rsp_i \leftarrow P_{a,2}(Ch_i; St_i, r_1, t_1, e_1)$ for the selected i. Then, the prover algorithm P sends $(Rsp_i, i)$ to the verifier (verifier algorithm V).

Step 4:

The verifier algorithm V that received $(Rsp_i, i)$ performs $0/1 \leftarrow Dec_a(F, y_i; (c_{i1},c_{12},c_{13}), Ch_i, Rsp_1)$. Then, in a case the output is 1 (in a case of acceptance), the verifier algorithm V assumes that verification is established.

In the foregoing, the interactive protocol (modified example 3) of a case where the scheme of the present method #1 is applied to the SSH10a public key authentication scheme has been described. The present modified example has its characteristic in that a usable verification pattern is limited to five patterns, $(Ch_1,Ch_2) \in \{(0,0),(1,1),(1,2),(2,1),(2,2)\}$.

In a case the elements ($c_{12}$, $c_{13}$) of $Cmt_1$ and the elements ($c_{22}$, $c_{23}$) of $Cmt_2$ are made common as described above, the response for $Ch_1=0$ (the response for $c_{12}$ and $c_{13}$) and the response for $Ch_2=0$ (the response for $c_{22}$ and $c_{23}$) will be the same. Accordingly, that "it is possible to respond to ($Ch_1$, $Ch_2$)=(0, 0)" means that "it is possible to respond to both $Ch_1=0$ and $Ch_2=0$." Therefore, the prover who can respond to ($Ch_1$, $Ch_2$)=(0, 0) is able to respond to any of ($Ch_1$, $Ch_2$)=(0,1), (0,2), (1,0), (2,0). Accordingly, it is sufficient that the verifier performs verification for five patterns, ($Ch_1$,$Ch_2$)=(0,0), (1,1), (1,2), (2,1), (2,2).

For the reason as described, it is guaranteed that, as long as the secret key sk is not known, it is not possible to respond to all the five patterns described above. That is, one who does not know the secret key sk can respond to only four patterns at maximum, and thus the falsification probability is ⅘ at the maximum. In the case of the interactive protocol shown in FIG. 9, the falsification probability in the case of L=2 was ⅝. Accordingly, applying the configuration of the modified example 3 will reduce the falsification probability.

2-6: Application to SSH10b Public Key Authentication Scheme

Next, an interactive protocol of a case where the scheme of the present method #1 is applied to the SSH10b public key authentication scheme will be described with reference to FIG. 13. FIG. 13 is an explanatory diagram for describing an interactive protocol of a case where the scheme of the present method #1 is applied to the SSH10b public key authentication scheme. This interactive protocol is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ and L vectors $s_1, \ldots, s_L \in K^n$. Additionally, a vector of n variables $(x_1, \ldots, x_n)$ will be expressed as x, and m second-order polynomials of n variables ($f_1(x), f_m(x)$) will be expressed as F(x). Next, the key generation algorithm Gen calculates $y_1=F(s_1), \ldots, y_L=F(s_L)$. Then, the key generation algorithm Gen sets (F, $y_1, \ldots, y_L$) to the public key pk, and sets ($s_1, \ldots, s_L$) to the secret key.

(Prover Algorithm P, Verifier Algorithm V)

Next, structures of the prover algorithm P and the verifier algorithm V will be described with reference to FIG. 13. The interactive protocol of the present scheme #1 is for making a verifier prove that "the prover knows the $s_i$ that satisfies L−1 pieces of $y_i=F(s_i)$" without leaking information on "which $s_i$ was used or was not used" at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #1 is configured from processing steps 1 to 6 shown in FIG. 13. In the following, the process of each step will be described.

Step 1:

First, the prover algorithm P generates a vector $r_i, t_i \in K^n$ and a vector $e_i \in K^m$ for i=1, ..., L. Next, the prover algorithm P calculates $(Cmt_{A,i}; St_{A,i}) \leftarrow P_{a,1}(F, y_i, s_i; r_i, t_i, e_i)$. Then, the prover algorithm P sends ($Cmt_{A,i}, \ldots, Cmt_{A,L}$) to the verifier (verifier algorithm V).

Step 2:

The verifier algorithm V that received ($Cmt_{A,i}, \ldots, Cmt_{A,L}$) selects a set of L random numbers ($\alpha_1, \ldots, \alpha_L$) from q types of elements of a ring K. Then, the verifier algorithm V sends a challenge ($Ch_{A,1}, \ldots, Ch_{A,L}$)=($\alpha_1, \ldots, \alpha_L$) to the prover (prover algorithm P).

Step 3:

The prover algorithm P that received ($Ch_{A,1}, \ldots, Ch_{A,L}$) calculates $(Cmt_{B,i}; St_{B,i}) \leftarrow P_{b,2}(Ch_{A,i}; St_{A,1})$ with respect to i=1, ..., L. Then, the prover algorithm P sends ($Cmt_{B,i}, \ldots, Cmt_{B,L}$) to the verifier (verifier algorithm V).

Step 4:

The verifier algorithm V that received ($Cmt_{B,1}, \ldots, Cmt_{B,L}$) selects a verification pattern to be used from two verification patterns for each i=1, ..., L. Then, the verifier algorithm V sends to prover (prover algorithm P) challenges $Ch_{B,1}, \ldots, Ch_{B,L} \in_R \{0, 1\}$ indicating the selected verification patterns.

Step 5:

The prover algorithm P that received $Ch_{B,1}, \ldots, Ch_{B,L}$ randomly selects, from i=1, ..., L, one i (hereinafter, i*) to which a response will not be given. Then, the prover algorithm P calculates $Rsp_i \leftarrow P_{b,3}(Ch_{B,i}; St_{B,i})$. Then, the prover algorithm P sends ($Rsp_1, \ldots, Rsp_{i*-1}, Rsp_{i*+1}, \ldots, Rsp_L$, i*) to the verifier (verifier algorithm V).

Step 6:

The verifier algorithm V that received ($Rsp_1, \ldots, Rsp_{i*-1}, Rsp_{i*+1}, \ldots, Rsp_L$, i*) performs $0/1 \leftarrow Dec_b(F, y_i; Cmt_{A,i}, Ch_{A,i}, Cmt_{B,i}, Ch_{B,i}, Rsp_i)$ with respect to i$\in\{1, \ldots, L\}$¥$\{i*\}$. Then, in a case of acceptance (output 1) for all of i$\in\{1, \ldots, L\}$¥$\{i*\}$, the verifier algorithm V assumes that verification is established.

In the foregoing, an interactive protocol of a case where the scheme of the present method #1 is applied to the SSH10b public key authentication scheme has been described. It is guaranteed for this interactive protocol that, owing to the security of the SSH10b public key authentication scheme, a falsifier not having the $s_i$ is able to correctly respond, with respect to each i=1, ..., L, to the challenge $Ch_i$ sent from the verifier with a probability of only ½+½q or less. Furthermore, by applying the present method #1, since it becomes necessary to correctly respond to the challenge $Ch_i$ sent from the verifier with respect to L−1 or more i's, the probability of success of falsification will be $(½+½q)^L + L(½-½q)(½+½q)^{L-1}$.

Furthermore, in the interactive protocol described above, all of $s_1, \ldots, s_L$ are used, but if L=2, it is possible, even if the $s_i$ was not used for one of i=1, ..., L, to behave exactly like the prover without letting know the verifier which $s_i$ was not used. Accordingly, an interactive protocol (modified example) capable of realizing the same authentication as the above-described interactive protocol without using one $s_i$ will be described.

2-7: Application to SSH10b Public Key Authentication Scheme

Modified Example

In the following, an interactive protocol (modified example) of a case where the scheme of the present method #1 is applied to the SSH10b public key authentication scheme will be described with reference to FIG. 14. FIG. 14 is an explanatory diagram for describing an interactive protocol (modified example) of a case where the scheme of the present method #1 is applied to the SSH10b public key authentication scheme. This interactive protocol is configured from a key generation algorithm Gen, a prover algorithm P and a verifier algorithm V. Incidentally, the structure of the falsification algorithm described above is used in the verifier algorithm V. Furthermore, explanation will be given for a case of L=2. Furthermore, the index of $s_i$ that is not used will be made $i_0$. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and L vectors $s_1, \ldots, s_L \in K^n$. Incidentally, a vector which is selected as appropriate is used as $s_{i0}$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1=F(s_1), \ldots, y_L=F(s_L)$. Additionally, $y_{i0}=F(s_{i0})$ does not have to be guaranteed. Then, the key generation algorithm Gen sets $(F, y_1, \ldots, y_L)$ to the public key pk, and sets $(s_1, \ldots, s_L)$ to the secret key.

(Prover Algorithm P, Verifier Algorithm V)

Next, structures of the prover algorithm P and the verifier algorithm V will be described with reference to FIG. 14. Additionally, the public key pk generated by the key generation algorithm Gen is assumed to be shared between a prover and a verifier. Also, the secret key sk generated by the key generation algorithm Gen is assumed to be secretly managed by the prover.

The interactive protocol of the present scheme #1 is configured from processing steps 1 to 6 shown in FIG. 14. In the following, the process of each step will be described.

Step 1:

First, the prover algorithm P generates a vector $r_i, t_i \in K^n$ and a vector $e_i \in K^m$ for i=1, 2. Next, the prover algorithm P selects one $Ch_B^* \in \{0, 1\}$. This $Ch_B^*$ corresponds to a verification pattern where the prover is not able to give a response with respect to the group of $i_0$. Next, if $i \neq i_0$, the prover algorithm P calculates $(Cmt_{A,i}; St_{A,i}) \leftarrow P_{b,1}(F, y_i, s_i; r_i, t_i, e_i)$. Also, if $i=i_0$, the prover algorithm P calculates $(Cmt_{A,i}; St_{A,i}) \leftarrow M_{b,1}(F, y_i; Ch_B^*, s_i, r_i, t_i, e_i)$. Then, the prover algorithm P sends $(Cmt_{A,1}, Cmt_{A,2})$ to the verifier (verifier algorithm V).

Step 2:

The verifier algorithm V that received $(Cmt_{A,i}, Cmt_{A,2})$ selects a set of two random numbers $(\alpha_1, \alpha_2)$ from q types of elements of a ring K Then, the verifier algorithm V sends a challenge $(Ch_{A,1}, Ch_{A,2})=(\alpha_1, \alpha_2)$ to the prover (prover algorithm P).

Step 3:

The prover algorithm P that received $(Ch_{A,1}, Ch_{A,2})$ calculates $Cmt_{B,i}$ with respect to i=1, 2 in the following manner. If $i \neq i_0$, the prover algorithm P calculates $(Cmt_{B,i}; St_{B,i}) \leftarrow P_{b,2}(Ch_{A,i}; St_{A,i})$. If $i=i_0$, the prover algorithm P calculates $(Cmt_{B,i}; St_{B,i}) \leftarrow M_{b,2}(Ch_{A,i}; St_{A,i})$. Then, the prover algorithm P sends $(Cmt_{B,1}, Cmt_{B,2})$ to the verifier (verifier algorithm V).

Step 4:

The verifier algorithm V that received $(Cmt_{B,1}, Cmt_{B,2})$ selects a verification pattern to be used from two verification patterns. Then, the verifier algorithm V sends to the prover (prover algorithm P) a challenge $(Ch_{B,1}, Ch_{B,2}) \in_R \{0, 1\}$ indicating the selected verification pattern.

Step 5:

The prover algorithm P that received $(Ch_{B,1}, Ch_{B,2})$ selects one index i (hereinafter, i*) to which a response will not be given from i=1, 2 in the following manner. If $Ch_{i,0}=Ch^*$, the prover algorithm P sets to $Ch_{i,0} \neq Ch^*$. On the other hand, if $i \neq i_0$, the prover algorithm P randomly performs setting so that it will be $i^* \neq i_0$. If this method of setting the i* is used, then no matter which verification pattern is requested by the verifier, the i* will take either of values 1 and 2 with a probability of ½, respectively. That is, information indicating the value that $i_0$ took between 1 and 2 is completely hidden.

Next, the prover algorithm P calculates $Rsp_i$ with respect to $i \in \{1,2\} \setminus \{i^*\}$ in the following manner. If $i \neq i_0$, the prover algorithm P calculates $Rsp_i \leftarrow P_{b,3}(Ch_i; St_i)$. If $i=i_0$, the prover algorithm P calculates $Rsp_i \leftarrow M_{b,3}(Ch_i; St_i)$. Then, the prover algorithm P sends $(Rsp_1, Rsp_2, i^*)$ to the verifier (verifier algorithm V).

Step 6:

The verifier algorithm V that received $(Rsp_1, Rsp_2, i^*)$ performs $0/1 \leftarrow Dec_b(F, y_i; Cmt_{A,i}, Ch_{A,i}, Cmt_{B,i}, Ch_{B,i}, Rsp_i)$ with respect to $i \in \{1,2\} \setminus \{i^*\}$. Then, in a case of acceptance (output 1) for all of $i \in \{1,2\} \setminus \{i^*\}$, the verifier algorithm V assumes that verification is established.

In the foregoing, an interactive protocol (modified example) of a case where the scheme of the present method #1 is applied to the SSH10b public key authentication scheme has been described. Explanation was given here for a case of L=2, but the same mechanism can also be realized for a case of L≥3.

In the foregoing, the first embodiment of the present disclosure has been described. The above explanation was given taking the SSH10a public key authentication scheme and the SSH10b public key authentication scheme as the examples, but the application scope of the present scheme #1 is not limited to these. Application is also possible to the modified examples of the SSH10a public key authentication scheme and the SSH10b public key authentication scheme and other public key authentication schemes. For example, in the example above, (F, y) is set to the public key, but since the F is a parameter not dependent of the secret key, this F may also be made a parameter common to the entire system instead of being set for each prover. In this case, the public keys to be individually published will be y only, and the size of the public key will be reduced. Furthermore, in the interactive protocol described above, random numbers $\alpha_1, \ldots, \alpha_L$ are separately selected for i=1, ..., L, but these random numbers can be made into one common random number. In this case, the cost of communication at the time of sending the challenge $Ch_{A,i}$ can be reduced.

3: Second Embodiment

Present Method #2

Next, a second embodiment (present method #2) of the present disclosure will be described.

3-1: Overview

The present method #2 applies to the SSH10a public key authentication scheme and the SSH10b public key authentication scheme a mechanism of guaranteeing a security level sufficient for an active attack. As has been described, the reason why it was not known whether the security level sufficient for an active attack was guaranteed or not is because collision resistance was not guaranteed for the function F to be used and also because it was not possible to prevent a verifier from knowing the information that "the prover who performed the verification used the s." Therefore, if the verifier can be prevented from knowing the information that "the prover who performed the verification used the s" in the interactive protocol, the security level sufficient for an active attack can be guaranteed.

Accordingly, the present inventors have devised a method of causing the secret key s and the public key y to be multiplexed keys. This method takes L (L≥2) $s_1, \ldots, s_L \in K^n$ as a secret key and takes $y_1, \ldots, y_L \in K^m$ that satisfies $(y_1, \ldots, y_L) = (F(s_1), \ldots, F(s_L))$ for m multi-order polynomials of n variables $F(x) = (f_1(x), \ldots, f_m(x))$ as a public key. Furthermore, this method is a method of performing authentication without giving away which $s_i$ is used in the interactive protocol. When applying this method, information related to "which $s_i$ was used" in the interactive protocol will not be leaked, and the security level sufficient for an active attack will be guaranteed.

According to the scheme of the present method #2, a verifier sends to a prover sets of challenges $(Ch_1^{(0)}, \ldots, Ch_L^{(0)})$ and $(Ch_1^{(0)}, \ldots, Ch_L^{(1)})$ with respect to i=1, . . . , L, and the prover selects one of the sets of challenges and gives a response. Generally, according to this scheme, Q sets (Q≥2) of challenges are sent to the prover, and the prover selects one set of challenges and gives a response. At this point, a case where Q=2 will be described. A prover who knows $s_1, \ldots, s_L$ will be able to give a response to both sets of challenges, but a falsifier who does not know $s_1, \ldots, s_L$ will fail with a certain probability to give a response to either challenge, thereby failing in falsification. Additionally, the prover can, with regard to one i, give a response to one of the sets of challenges without using the s and thus even when an interactive protocol where verification will be accepted was performed, which $s_i$ was used in this interactive protocol will not be known to the verifier.

3-2: Application to SSH10a Public Key Authentication Scheme

First, an interactive protocol of a case where the scheme of the present method #2 is applied to the SSH10a public key authentication scheme will be described with reference to FIG. 15. FIG. 15 is an explanatory diagram for describing an interactive protocol of a case where the scheme of the present method #2 is applied to the SSH10a public key authentication scheme. This interactive protocol is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and L vectors $s_1, \ldots, s_L \in K^n$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1 = F(s_1), \ldots, y_L = F(s_L)$. Then, the key generation algorithm Gen sets $(F, y_1, \ldots, y_L)$ to the public key pk, and sets $(s_1, \ldots, s_L)$ to the secret key.

Next, structures of the prover algorithm P and the verifier algorithm V will be described with reference to FIG. 15. The interactive protocol of the present scheme #1 is for making a verifier prove that "prover knows the $s_i$ that satisfies L−1 pieces of $y_i = F(s_i)$" without leaking information on "which $s_i$ was used or was not used" at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #2 is configured from processing steps 1 to 4 shown in FIG. 15. In the following, the process of each step will be described.

Step 1:

First, the prover algorithm P generates a vector $r_i, t_i \in K^n$ and a vector $e_i \in K^m$ with respect to i=1, . . . , L. Next, the prover algorithm P calculates $(Cmt_i; St_i) \leftarrow P_{a,1}(F, y_i, s_i; r_i, t_i, e_i)$. Then, the prover algorithm P sends $Cmt_1, \ldots, Cmt_L$ to the verifier (verifier algorithm V).

Step 2:

The verifier algorithm V that received $Cmt_1, \ldots, Cmt_L$ selects a verification pattern to be used from three verification patterns. At this time, the verifier algorithm V selects a combination of two verification patterns. Then, the verifier algorithm V sends to the prover (prover algorithm P) sets of challenges))) $(Ch_1^{(0)}, \ldots, Ch_L^{(0)}), (Ch_1^{(1)}, \ldots, Ch_L^{(1)}) \in_R \{0, 1, 2\}$ indicating the selected verification patterns.

Step 3:

The prover algorithm P that received $(Ch_1^{(0)}, \ldots, Ch_L^{(0)})$ and $(Ch_1^{(1)}, \ldots, Ch_L^{(1)})$ randomly selects a set of challenges to which a response will be given. Additionally, the result of selection will be expressed as $d \in_R \{0, 1\}$. Then, the prover algorithm P calculates $Rsp_i \leftarrow P_{a,2}(Ch^{(d)}_i; St_i)$ with respect to $i \in \{1, \ldots, L\}$. Then, the prover algorithm P sends $(Rsp_1, \ldots, Rsp_L, d)$ to the verifier (verifier algorithm V).

Step 4:

The verifier algorithm V that received $(Rsp_1, \ldots, Rsp_L, d)$ performs $0/1 \leftarrow Dec_a(F, y_i; Cmt_i, Ch^{(d)}_i, Rsp_i)$ with respect to $i \in \{1, \ldots, L\}$. Then, in a case of acceptance (output 1) for all of $i \in \{1, \ldots, L\}$, the verifier algorithm V assumes that verification is established.

In the foregoing, an interactive protocol of a case where the scheme of the present method #2 is applied to the SSH10a public key authentication scheme has been described. It is guaranteed for this interactive protocol that, owing to the security of the SSH10a public key authentication scheme, a falsifier not having the $s_i$ is able to correctly respond, with respect to each i=1, L, to the challenge $Ch_i$ sent from the verifier with a probability of only ⅔ or less. Furthermore, by applying the present method #2, since it becomes necessary to correctly respond to the challenge $Ch_i$ sent from the verifier with respect to L i's for one of two sets of challenges, the probability of success of falsification will be $(\frac{2}{3})^L + (\frac{2}{3})^L - (\frac{1}{3})^L = (2^{L+1} - 1)/3^L$.

Furthermore, in the interactive protocol described above, all of $s_1, \ldots, s_L$ are used, but if L≤3, it is possible, when the $s_i$ was not used for one of i=1, . . . , L, to behave exactly like the prover without letting know the verifier which $s_i$ was not used. Accordingly, an interactive protocol (modified example) capable of realizing the same authentication as the above-described interactive protocol without using one $s_i$ will be described.

3-3: Application to SSH10a Public Key Authentication Scheme

Modified Example

In the following, an interactive protocol (modified example) of a case where the scheme of the present method #2 is applied to the SSH10a public key authentication scheme will be described with reference to FIG. 16. FIG. 16 is an explanatory diagram for describing an interactive protocol (modified example) of a case where the scheme of the present method #2 is applied to the SSH10a public key authentication scheme. This interactive protocol is configured from a key generation algorithm Gen, a prover algorithm P and a verifier algorithm V. Incidentally, the structure of the falsification algorithm described above is used in the verifier algorithm V. Furthermore, the index of $s_i$ that is not used will be made $i_0$. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and L vectors $s_1, \ldots, s_L \in K^n$. Incidentally, a vector which is selected as appropriate is used as $s_{i0}$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1=F(s_1), \ldots, y_L=F(s_L)$. Additionally, $y_{i0}=F(s_{i0})$ does not have to be guaranteed. Then, the key generation algorithm Gen sets $(F, y_1, \ldots, y_L)$ to the public key pk, and sets $(s_1, \ldots, s_L)$ to the secret key.

(Prover Algorithm P, Verifier Algorithm V)

Next, structures of the prover algorithm P and the verifier algorithm V will be described with reference to FIG. 16. Additionally, the public key pk generated by the key generation algorithm Gen is assumed to be shared between a prover and a verifier. Also, the secret key sk generated by the key generation algorithm Gen is assumed to be secretly managed by the prover.

Figure 16:
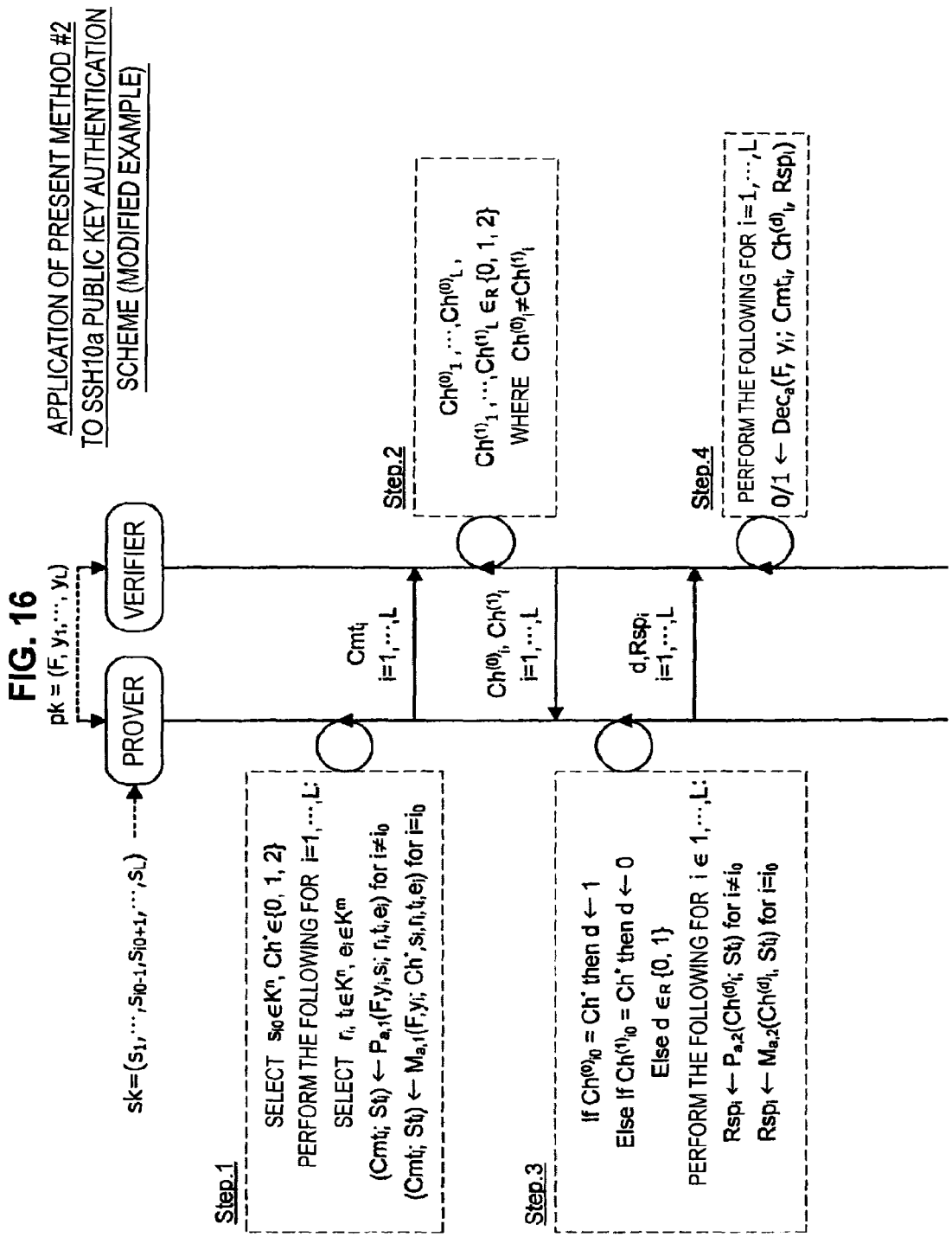
FIG. 16 is an explanatory diagram for describing a method of applying the present method #2 to the interactive protocol of the SSH10a public key authentication scheme (modified example)

The interactive protocol of the present scheme #2 is configured from processing steps 1 to 4 shown in FIG. 16. In the following, the process of each step will be described.

Step 1:

First, the prover algorithm P generates a vector $r_i, t_i \in K^n$ and a vector $e_i \in K^m$ for $i=1, \ldots, L$. Next, the prover algorithm P selects one $Ch^* \in \{0, 1, 2\}$. This $Ch^*$ corresponds to a verification pattern where the prover is not able to give a response with respect to the group of $i_0$. Next, if $i \neq i_0$, the prover algorithm P calculates $(Cmt_i; St_i) \leftarrow P_{a,1}(F, y_i, s_i; r_i, t_i, e_i)$. On the other hand, if $i=i_0$, the prover algorithm P calculates $(Cmt_i; St_i) \leftarrow M_{a,1}(F, y_i; Ch^*, s_i, r_i, t_i, e_i)$. Then, the prover algorithm P sends $Cmt_1, \ldots, Cmt_L$ to the verifier (verifier algorithm V).

Step 2:

The verifier algorithm V that received $Cmt_1, \ldots, Cmt_L$ selects a verification pattern to be used from three verification patterns. At this point, the verifier algorithm V selects a combination of two verification patterns. Then, the verifier algorithm V sends to the prover (prover algorithm P) sets of challenges))) $(Ch_1^{(0)}, \ldots, Ch_L^{(0)}), (Ch_1^{(1)}, \ldots, Ch_L^{(1)}) \in_R \{0, 1, 2\}$ indicating the selected verification patterns. Additionally, $Ch_i^{(0)}$ is not equal to $Ch_i^{(1)}$.

Step 3:

The prover algorithm P that received $(Ch_1^{(0)}, \ldots, Ch_L^{(0)})$ and $(Ch_1^{(1)}, \ldots, Ch_L^{(1)})$ selects a set of challenges to which a response will be given in the following manner. Additionally, the result of selection will be expressed as $d \in_R \{0, 1\}$. If $Ch_{i0}^{(0)} = Ch^*$ (condition 1), the prover algorithm P sets to $d \leftarrow 1$. On the other hand, if $Ch_{i0}^{(1)} = Ch^*$ (condition 2), the prover algorithm P sets to $d \leftarrow 0$. In cases other than conditions 1 and 2, the prover algorithm P randomly sets $d \in \{0, 1\}$. According to this method of setting, no matter which verification pattern is requested by the verifier, the d will take either of values 0 and 1 with a probability of ½, and thus information indicating the value that $i_0$ takes among $1, \ldots, L$ will be completely hidden.

After the d is set, the prover algorithm P calculates $Rsp_i$ with respect to $i \in \{1, \ldots, L\}$ in the following manner. If $i \neq i_0$, the prover algorithm P calculates $Rsp_i \leftarrow P_{a,2}(Ch^{(d)}_i; St_i)$. On the other hand, if $i=i_0$, the prover algorithm P calculates $Rsp_i \leftarrow M_{a,2}(Ch^{(d)}_i; St_i)$. Then, the prover algorithm P sends $(Rsp_1, \ldots, Rsp_L, d)$ to the verifier (verifier algorithm V).

Step 4:

The verifier algorithm V that received $(Rsp_1, \ldots, Rsp_L, d)$ performs $0/1 \leftarrow Dec_a(F, y_i; Cmt_i, Ch^{(d)}_i, Rsp_i)$ with respect to $i \in \{1, \ldots, L\}$. Then, in a case of acceptance (output 1) for all of $i \in \{1, \ldots, L\}$, the verifier algorithm V assumes that verification is established.

In the foregoing, an interactive protocol (modified example) of a case where the scheme of the present method #2 is applied to the SSH10a public key authentication scheme has been described. Additionally, in the above explanation, two sets of challenges are sent from the verifier to the prover, but it is also possible to determine beforehand the second challenge to be $Ch_i^{(1)} = Ch_i^{(0)} + 1 \mod 3$, for example. In this case, one of the sets of challenges does not have to be sent, and thus the amount of communication can be reduced.

3-4: Application to SSH10b Public Key Authentication Scheme

Figure 17:
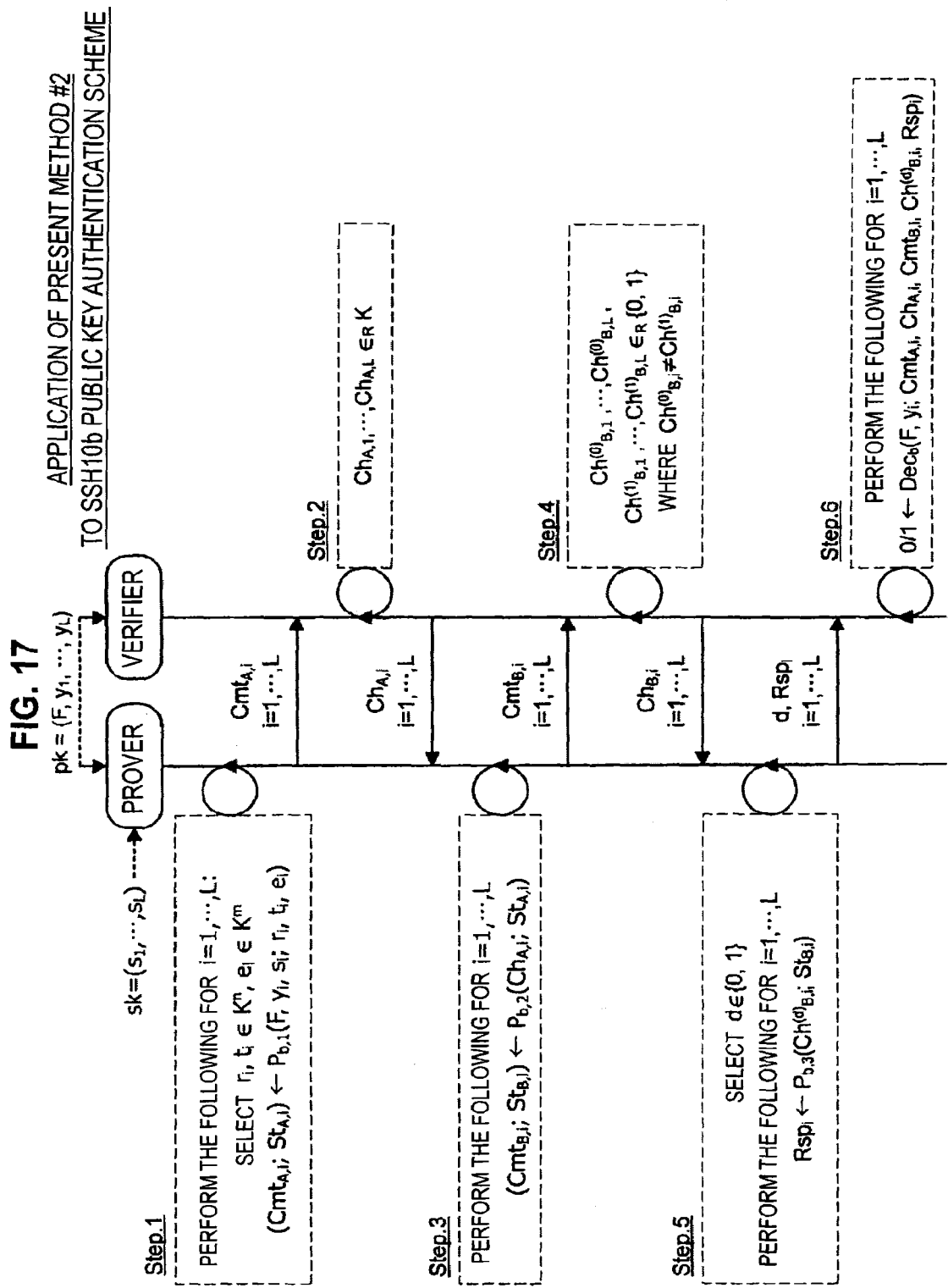
FIG. 17 is an explanatory diagram for describing a method of applying the present method #2 to the interactive protocol of the SSH10b public key authentication scheme.

Next, an interactive protocol of a case where the scheme of the present method #2 is applied to the SSH10b public key authentication scheme will be described with reference to FIG. 17. FIG. 17 is an explanatory diagram for describing an interactive protocol of a case where the scheme of the present method #2 is applied to the SSH10b public key authentication scheme. This interactive protocol is configured from a key generation algorithm Gen, a prover algorithm P and a verifier algorithm V. In the following, contents of each algorithm will be described.

(Key Generation Algorithm Gen)

First, a structure of the key generation algorithm Gen will be described. The key generation algorithm Gen generates m second-order polynomials of n variables $f_1(x_1, \ldots, x_n), \ldots, f_m(x_1, \ldots, x_n)$ defined on a ring K and L vectors $s_1, \ldots, s_L \in K^n$. Additionally, a vector of n variables $(x_1, \ldots, x_n)$ will be expressed as x, and m second-order polynomials of n variables $(f_1(x), \ldots, f_m(x))$ will be expressed as F(x). Next, the key generation algorithm Gen calculates $y_1=F(s_1), \ldots, y_L=F(s_L)$. Then, the key generation algorithm Gen sets $(F, y_1, \ldots, y_L)$ to the public key pk, and sets $(s_1, \ldots, s_L)$ to the secret key.

(Prover Algorithm P, Verifier Algorithm V)

Next, structures of the prover algorithm P and the verifier algorithm V will be described with reference to FIG. 135. The interactive protocol of the present scheme #2 is for making a verifier prove that "prover knows the $s_i$ that satisfies L−1 pieces of $y_i = F(s_i)$" without leaking information on "which $s_i$ was used or was not used" at all to the verifier. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #2 is configured from processing steps 1 to 6 shown in FIG. 17. In the following, the process of each step will be described.

Step 1:

First, the prover algorithm P generates a vector $r_i, t_i \in K^n$ and a vector $e_i \in K^m$ with respect to $i=1, \ldots, L$. Next, the prover algorithm P calculates $(Cmt_{A,i}; St_{A,i}) \leftarrow P_{a,1}(F, y_i, s_i;$ $r_i$, $t_i$, $e_i$). Then, the prover algorithm P sends ($Cmt_{A,1}$, ..., $Cmt_{A,L}$) to the verifier (verifier algorithm V).

Step 2:

The verifier algorithm V that received ($Cmt_{A,1}$, ..., $Cmt_{A,L}$) selects a set of L random numbers ($\alpha_1$, ..., $\alpha_L$) from q types of elements of a ring K. Then, the verifier algorithm V sends a challenge ($Ch_{A,1}$, ..., $Ch_{A,L}$)=($\alpha_1$, ..., $\alpha_L$) to the prover (prover algorithm P).

Step 3:

The prover algorithm P that received ($Ch_{A,1}$, ..., $Ch_{A,L}$) calculates ($Cmt_{B,i}$; $St_{B,i}$)←$P_{b,2}$($Ch_{A,i}$; $St_{A,i}$) with respect to i=1, ..., L. Then, the prover algorithm P sends ($Cmt_{B,1}$, ..., $Cmt_{B,L}$) to the verifier (verifier algorithm V).

Step 4:

The verifier algorithm V that received ($Cmt_{B,1}$, ..., $Cmt_{B,L}$) selects a verification pattern to be used from three verification patterns. At this point, the verifier algorithm V selects a combination of two verification patterns. Then, the verifier algorithm V sends to the prover (prover algorithm P) sets of challenges))) ($Ch_{B,1}^{(0)}$, ..., $Ch_{B,L}^{(0)}$), ($Ch_{B,1}^{(1)}$, ..., $Ch_{B,L}^{(1)}$)$\in_R \{0, 1\}^L$ indicating the selected verification patterns. Additionally, $Ch_{B,i}^{(0)}$ is not equal to $Ch_{B,i}^{(1)}$.

Step 5:

The prover algorithm P that received ($Ch_{B,1}^{(0)}$, ..., $Ch_{B,L}^{(0)}$) and ($Ch_{B,1}^{(1)}$, ..., $Ch_{B,L}^{(1)}$) randomly selects one set of challenges to which a response will be given. Additionally, the result of selection will be expressed as d$\in_R\{0, 1\}$. Then, the prover algorithm P calculates $Rsp_i \leftarrow P_{b,2}$($Ch_{B,i}^{(d)}$; $St_{B,i}$) with respect to i$\in\{1, ..., L\}$. Then, the prover algorithm P sends ($Rsp_1$, ..., $Rsp_L$, d) to the verifier (verifier algorithm V).

Step 6:

The verifier algorithm V that received ($Rsp_1$, ..., $Rsp_L$, d) performs 0/1←$Dec_b$(F, $y_i$; $Cmt_{A,i}$, $Ch_{A,i}$, $Cmt_{B,i}$, $Ch_{B,i}^{(d)}$, $Rsp_i$) with respect to i$\in\{1, ..., L\}$. Then, in a case of acceptance (output 1) for all of i$\in\{1, ..., L\}$, the verifier algorithm V assumes that verification is established.

In the foregoing, an interactive protocol of a case where the scheme of the present method #2 is applied to the SSH10b public key authentication scheme has been described. It is guaranteed for this interactive protocol that, owing to the security of the SSH10b public key authentication scheme, a falsifier not having the s, is able to correctly respond, with respect to each i=1, ..., L, to the challenge sent from the verifier with a probability of only ½+½q or less. Furthermore, by applying the present method #2, since it becomes necessary to correctly respond to the challenge sent from the verifier with respect to L i's for one of two sets of challenges, the probability of success of falsification will be (½+½q)$^L$+(½+½q)$^L$=2(½+½q)$^L$.

Furthermore, in the interactive protocol described above, all of $s_1$, ..., $s_L$ are used, but even if the $s_i$ is not used for one of i=1, ..., L, it is possible to behave exactly like the prover without letting know the verifier which $s_i$ was not used. Accordingly, an interactive protocol (modified example) capable of realizing the same authentication as the above-described interactive protocol without using one $s_i$ will be described.

3-5: Application to SSH10b Public Key Authentication Scheme

Modified Example

Figure 18:
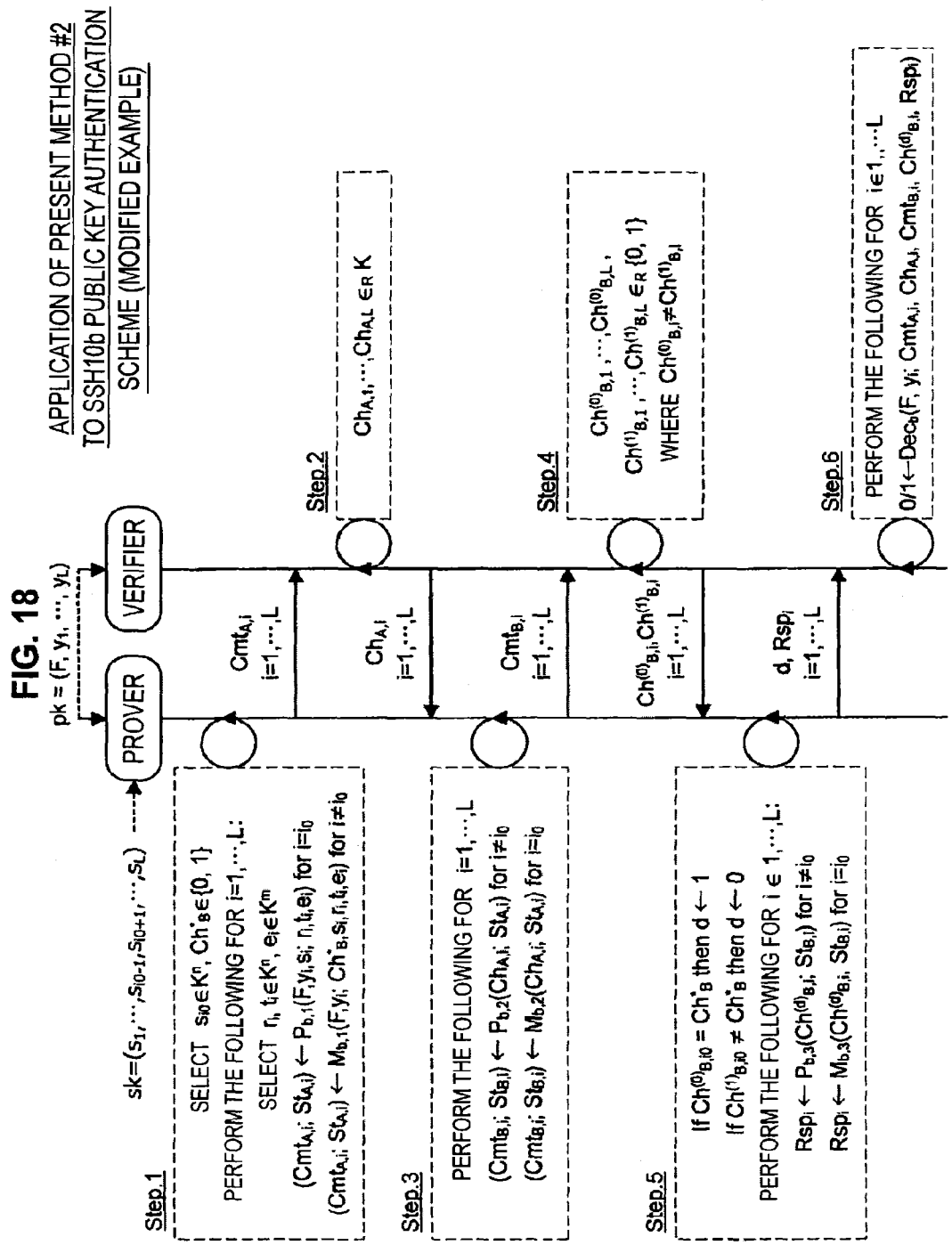
FIG. 18 is an explanatory diagram for describing a method of applying the present method #2 to the interactive protocol of the SSH10b public key authentication scheme (modified example)

First, an interactive protocol (modified example) of a case where the scheme of the present method #2 is applied to the SSH10b public key authentication scheme will be described with reference to FIG. 18. FIG. 18 is an explanatory diagram for describing an interactive protocol (modified example) of a case where the scheme of the present method #2 is applied to the SSH10b public key authentication scheme. This interactive protocol is configured from a key generation algorithm Gen, a prover algorithm P and a verifier algorithm V. Incidentally, the structure of the falsification algorithm described above is used in the verifier algorithm V. Furthermore, the index of $s_i$ that is not used will be made $i_0$. In the following, contents of each algorithm will be described.

(Key Generation Algorithm Gen)

First, a structure of the key generation algorithm Gen will be described. The key generation algorithm Gen generates m second-order polynomials of n variables $f_1(x_1, ..., x_n)$, ..., $f_m(x_1, ..., x_n)$ defined on a ring K and L vectors $s_1, ..., s_L \in K^n$. Incidentally, a vector which is selected as appropriate is used as $s_{i0}$. Additionally, a vector of n variables ($x_1, ..., x_n$) is expressed as x, and m second-order polynomials of n variables ($f_1(x)$, ..., $f_m(x)$) will be expressed as F(x). Next, the key generation algorithm Gen calculates $y_1=F(s_1)$, ..., $y_L=F(s_L)$. Additionally, $y_{i0}=F(s_{i0})$ does not have to be guaranteed. Then, the key generation algorithm Gen sets (F, $y_1$, ..., $y_L$) to the public key pk, and sets ($s_1$, ..., $s_L$) to the secret key.

(Prover Algorithm P, Verifier Algorithm V)

Next, structures of the prover algorithm P and the verifier algorithm V will be described with reference to FIG. 18. Additionally, the public key pk generated by the key generation algorithm Gen is assumed to be shared between the prover and the verifier. Also, the secret key sk generated by the key generation algorithm Gen is assumed to be secretly managed by the prover.

The interactive protocol of the present scheme #2 is configured from processing steps 1 to 6 shown in FIG. 18. In the following, the process of each step will be described.

Step 1:

First, the prover algorithm P generates a vector $r_i,t_i \in K^n$ and a vector $e_i \in K^m$ with respect to i=1, ..., L. Next, the prover algorithm P selects one $Ch_B^* \in \{0, 1\}$. This Ch* corresponds to a verification pattern where the prover is not able to give a response with respect to the group of $i_0$. Next, the prover algorithm P calculates ($Cmt_{A,i}$; $St_{A,i}$)←$P_{b,1}$(F, $y_i$, $s_i$; $r_i$, $t_i$, $e_i$) for the case of i≠$i_0$. Furthermore, the prover algorithm P calculates ($Cmt_{A,i}$; $St_{A,i}$)←$M_{b,1}$(F, $y_i$; $Ch_B^*$, $s_i$, $r_i$, $t_i$, $e_i$) for the case of i=$i_0$. Then, the prover algorithm P sends ($Cmt_{A,1}$, ..., $Cmt_{A,L}$) to the verifier (verifier algorithm V).

Step 2:

The verifier algorithm V that received ($Cmt_{A,1}$, ..., $Cmt_{A,L}$) selects a set of L random numbers ($\alpha_1$, ..., $\alpha_L$) from q types of elements of a ring K. Then, the verifier algorithm V sends a challenge ($Ch_{A,1}$, ..., $Ch_{A,L}$)=($\alpha_1$, ..., $\alpha_L$) to the prover (prover algorithm P).

Step 3:

The prover algorithm P that received ($Ch_{A,1}$, ..., $Ch_{A,L}$) calculates $Cmt_{B,i}$ with respect to i=1, ..., L in the following manner. First, if i≠$i_0$, the prover algorithm P calculates ($Cmt_{B,i}$; $St_{B,i}$)←$P_{b,2}$($Ch_{A,i}$; $St_{A,i}$). On the other hand, if i=$i_0$, the prover algorithm P calculates ($Cmt_{B,i}$; $St_{B,i}$)←$M_{b,2}$($Ch_{A,i}$; $St_{A,i}$). Then, the prover algorithm P sends ($Cmt_{B,1}$, ..., $Cmt_{B,L}$) to the verifier (verifier algorithm V).

Step 4:

The verifier algorithm V that received ($Cmt_{B,1}$, ..., $Cmt_{B,L}$) selects a verification pattern to be used from three verification patterns. At this point, the verifier algorithm V selects a combination of two verification patterns. Then, the verifier algorithm V sends to the prover (prover algorithm P)

sets of challenges))) $(Ch_{B,1}^{(0)}, \ldots, Ch_{B,L}^{(0)})$, $(Ch_{B,1}^{(1)}, \ldots, Ch_{B,L}^{(1)}) \in_R \{0, 1\}^L$ indicating the selected verification patterns. Additionally, $Ch_{B,i}^{(0)}$ is not equal to $Ch_{B,i}^{(1)}$.

Step 5:

The prover algorithm P that received $(Ch_{B,1}^{(0)}, \ldots, Ch_{B,L}^{(0)})$ and $(Ch_{B,1}^{(1)}, \ldots, Ch_{B,L}^{(1)})$ selects a set of challenges to which a response will be given in the following manner. Additionally, the result of selection will be expressed as $d \in_R \{0, 1\}$. If $Ch_{B,i0}^{(0)} = Ch_B^*$, the prover algorithm P sets to $d \leftarrow 1$. On the other hand, if $Ch_{B,i0}^{(1)} = Ch_B^*$, the prover algorithm P sets to $d \leftarrow 0$. When using this method of setting, no matter which verification pattern is requested by the verifier, the d will take either of values 0 and 1 with a probability of ½, respectively. That is, information indicating the value that d took between 0 and 1 is completely hidden.

Next, the prover algorithm P calculates $Rsp_i$ with respect to $i=1, \ldots, L$. The prover algorithm P calculates $Rsp_i \leftarrow P_{b,3}(Ch_{B,i}^{(d)}; St_{B,i})$ for the case of $i \neq i_0$. Also, the prover algorithm P calculates $Rsp_i \leftarrow M_{b,3}(Ch_{B,i}^{(d)}; St_{B,i})$ for the case of $i=i_0$. Then, the prover algorithm P sends $(Rsp_1, \ldots, Rsp_L, d)$ to the verifier (verifier algorithm V).

Step 6:

The verifier algorithm V that received $(Rsp_1, \ldots, Rsp_L, d)$ performs $0/1 \leftarrow Dec_b(F, y_i; Cmt_{A,i}, Ch_{A,i}, Cmt_{B,i}, Ch_{B,i}^{(d)}, Rsp_i)$ with respect to $i=1, \ldots, L$. Then, in a case of acceptance (output 1) for all of $i=1, L$, the verifier algorithm V assumes that verification is established.

In the foregoing, an interactive protocol (modified example) of a case where the scheme of the present method #2 is applied to the SSH10b public key authentication scheme has been described. Additionally, in the above explanation, two sets of challenges are sent from the verifier to the prover, but it is also possible to determine beforehand the second challenge to be $Ch_i^{(1)} = Ch_i^{(0)} + 1 \mod 2$, for example. In this case, one of the sets of challenges does not have to be sent, and thus the amount of communication can be reduced.

In the foregoing, the second embodiment of the present disclosure has been described. The above explanation was given taking the SSH10a public key authentication scheme and the SSH10b public key authentication scheme as the examples, but the application scope of the present scheme #2 is not limited to these. Application is also possible to the modified examples of the SSH10a public key authentication scheme and the SSH10b public key authentication scheme and other public key authentication schemes. For example, in the example above, (F, y) is set to the public key, but since the F is a parameter not dependent of the secret key, this F may also be made a parameter common to the entire system instead of being set for each prover. In this case, the public keys to be individually published will be y only, and the size of the public key will be reduced. Furthermore, in the interactive protocol described above, random numbers $\alpha_1, \ldots, \alpha_L$ are separately selected for $i=1, \ldots, L$, but these random numbers can be made into one common random number. In this case, the cost of communication at the time of sending the challenge $Ch_{A,i}$ can be reduced.

4: Supplement

A supplemental explanation will be given here of the present methods #1 and #2.

[4-1: Extension of Scheme]

In the foregoing, public key authentication schemes based on the problem of multi-order multivariate simultaneous equation have been described. However, the concept of the present methods #1 and #2 can likewise be applied to other public key authentication schemes. Accordingly, as examples, a method of application to the public key authentication scheme based on the Syndrome Decoding problem, a method of application to the public key authentication scheme based on the Constrained Linear Equations problem, a method of application to the public key authentication scheme based on the Permuted Kernel problem, a method of application to the public key authentication scheme based on the section-finding problem on an algebraic surface, and a method of application to the public key authentication scheme based on the Permuted Perceptrons problem will be introduced.

(Application to Syndrome Decoding Problem)

The public key authentication scheme based on the Syndrome Decoding problem is disclosed in, for example, Jacques Stern, "A New Identification Scheme Based on Syndrome Decoding, CRYPTO 1993, p 13-21" and Jacques Stern, "A New Paradigm for Public Key Identification, IEEE Transactions on Information Theory, 1996, p 13-21." According to these, this public key authentication scheme includes a 3-pass scheme and a 5-pass scheme.

As with the SSH10a public key authentication scheme, there are three verification patterns for the 3-pass scheme, and there exists a falsification algorithm that can cope with two of the three patterns. Also, as with the SSH10b public key authentication scheme, there are two verification patterns for the 5-pass scheme, and there exists a falsification algorithm that can cope with one of the two patterns. Accordingly, the method described above in relation to the SSH10a public key authentication scheme can be applied to the 3-pass scheme, and the method described above in relation to the SSH10b public key authentication scheme can be applied to the 5-pass scheme.

(Application to Constrained Linear Equations Problem)

The public key authentication scheme based on the Constrained Linear Equations problem is disclosed in, for example, Jacques Stern, "Designing Identification Schemes with Keys of Short Size, CRYPTO 1994, p 164-173." According to this, this public key authentication scheme also includes a 3-pass scheme and a 5-pass scheme.

As with the SSH10a public key authentication scheme, there are three verification patterns for the 3-pass scheme, and there exists a falsification pattern that can cope with two of the three patterns. Also, as with the SSH10b public key authentication scheme, there are two verification patterns for the 5-pass scheme, and there exists a falsification algorithm that can cope with one of the two patterns. Accordingly, the method described above in relation to the SSH10a public key authentication scheme can be applied to the 3-pass scheme, and the method described above in relation to the SSH10b public key authentication scheme can be applied to the 5-pass scheme.

(Application to Permuted Kernel Problem)

The public key authentication scheme based on the Permuted Kernel problem is disclosed in, for example, Adi Shamir, "An Efficient Identification Scheme Based on Permuted Kernels (Extended Abstract), CRYPTO 1989, p 606-609." According to this, there are two verification patterns for this public key authentication scheme, and there exists a falsification algorithm that can cope with one of the two patterns. Accordingly, the method described above in relation to the SSH10b public key authentication scheme can be applied to the public key authentication scheme.

(Application to Section-Finding Problem on Algebraic Surface)

The public key authentication scheme based on the section-finding problem on an algebraic surface includes a 3-pass scheme and a 5-pass scheme (for example, see JP 2010-125026A). As with the SSH10a public key authentication scheme, there are three verification patterns for the 3-pass scheme, and there exists a falsification algorithm that can cope with two of the three patterns. Also, as with the SSH10b public key authentication scheme, there are two verification patterns for the 5-pass scheme, and there exists a falsification algorithm that can cope with one of the two patterns. Accordingly, the method described above in relation to the SSH10a public key authentication scheme can be applied to the 3-pass scheme, and the method described above in relation to the SSH10b public key authentication scheme can be applied to the 5-pass scheme.

(Application to Permuted Perceptrons Problem)

The public key authentication scheme based on the Permuted Perceptrons problem is disclosed in, for example, David Pointcheval, "A New Identification Scheme Based on the Perceptrons Problem, EUROCRYPT 1995, p 319-328" and David Pointcheval and Guillaume Poupard, "A New NP-Complete Problem and Public-Key Identification, Des. Codes Cryptography, 2003, p 5-31." According to these, this public key authentication scheme includes a 3-pass scheme and a 5-pass scheme.

There are four verification patterns for the 3-pass scheme, and there exists a falsification algorithm that can cope with three of the four patterns. On the other hand, there are three verification patterns for the 5-pass scheme, and there exists a falsification algorithm that can cope with two of the three patterns. Accordingly, as with the SSH10a public key authentication scheme and the SSH10b public key authentication scheme, the technologies of the present methods #1 and #2 can be applied to this public key authentication scheme. However, when applying the present method #1 to this public key authentication scheme, the following change has to be made.

When applying the present method #1 to a scheme with k verification patterns while causing the secret key to be a multiplexed key including L=k keys, one i (hereinafter, i*) to which a response will not be given has to be selected from i=1, . . . , L in the following manner. Specifically, the method of selecting the i* is a method of selecting i*←$i_0$ in the case of $Ch_{i_0}$=Ch*, and randomly selecting the i* from i*∈{1, . . . , L}¥{$i_0$} in the case of $Ch_{i_0}$≠Ch*.

Furthermore, when applying the present method #1 to a scheme with k verification patterns while causing the secret key to be a multiplexed key including L (L<k) keys, one i (hereinafter, i*) to which a response will not be given has to be selected from i=1, . . . , L in the following manner. Specifically, the method of selecting the i* is a method of selecting i*←$i_0$ in the case of $Ch_{i_0}$=Ch*, and selecting i*←$i_0$ with a probability of $(1-1/k)^{-1}(1/L-1/k)$ and randomly selecting the i* from i*∈{1, . . . , L}¥{$i_0$} with a probability of $1-(1-1/k)^{-1}(1/L-1/k)$ in the case of $Ch_{i_0}$≠Ch*.

According to the above method, no matter which verification pattern is requested by the verifier, the i* will take a value among 1, . . . , L with a probability of 1/L, and the information indicating the value the $i_0$ took among 1, . . . , L will be completely hidden.

As described above, the present methods #1 and #2 can be applied not only to the SSH10a public key authentication scheme and the SSH10b public key authentication scheme, but also to various public key authentication schemes.

[4-2: Non-Interactive Public Key Authentication Scheme]

The public key authentication schemes adopting the present methods #1 and #2 described above are schemes where the verifier sends only a random number, and thus modification into a 1-pass (non-interactive) public key authentication scheme is possible. For example, that obtained by applying a hash function to the contents of exchange with the verifier in the configuration of N parallel repetitions may be used instead of the random number to be sent from the verifier. A random number selected by the prover may also be added to the argument of the hash function. With the prover herself using the hash function instead of the verifier selecting the random number in this manner, a behaviour same as that in the case of the verifier selecting the random number is realized. Additionally, it is desirable that an ideal hash function is used. Furthermore, the number N of repetitions is desirably made sufficiently large so as not to enable falsification. Such refinement enables modification into the non-interactive public key authentication scheme.

[4-3: Method of Reducing Amount of Communication]

A brief supplemental explanation will be given here of a method of reducing the amount of communication in an interactive protocol with reference to FIGS. 19 and 20.

As has been described, a set of messages ($c_1, c_2, c_3$) is sent from the prover to the verifier in the first pass in the SSH10a public key authentication scheme. Additionally, in the above explanation, an expression Cmt was used. In the case of the configuration of N parallel repetitions, this set of messages will be ($c_{1,1}, c_{1,2}, C_{1,3}, \ldots, c_{N,1}, c_{N,2}, c_{N,3}$) as shown in FIG. 19, and the amount of communication will be extremely large. Thus, the present inventors have devised a configuration for sending these messages collectively as one hash value.

Figure 19:
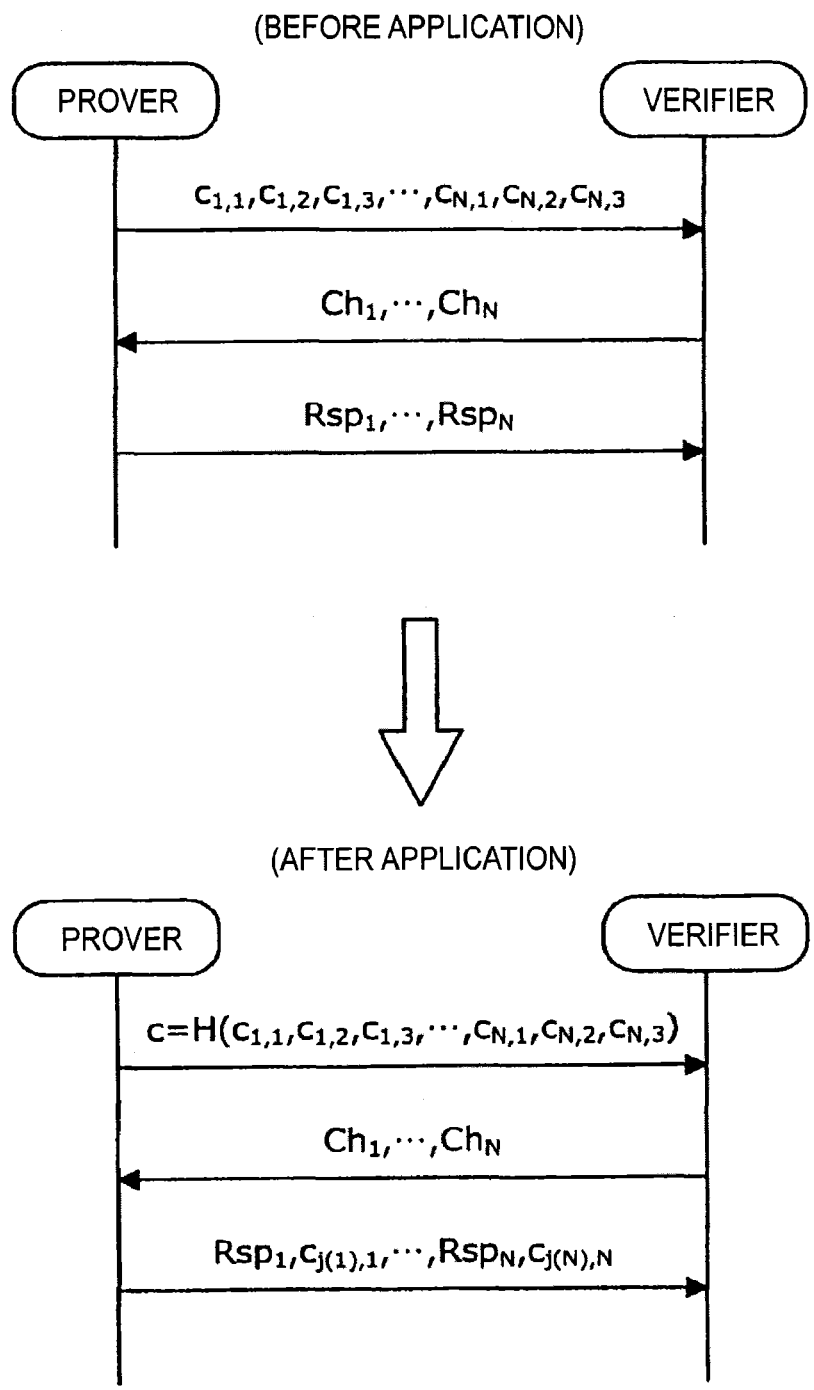
FIG. 19 is an explanatory diagram for describing a method of reducing the amount of communication in the interactive protocol of the SSH10a public key authentication scheme.

As shown in FIG. 19, when adopting this configuration, the message to be sent in the first pass will be one hash value only, and the amount of communication can be greatly reduced. Moreover, this hash value and a hash value that is not restored from a response to a challenge sent from the prover are to be sent from the prover together with the response. According to this configuration, in the case of the configuration of N parallel repetitions, the number of pieces of information to be sent can be reduced by 2N−1. The same configuration can be applied to the SSH10b public key authentication scheme, as shown in FIG. 20. In this case, the number of pieces of information to be sent can be reduced by N−1.

In the following, a supplementary explanation has been given for the present methods #1 and #2.

5: Hardware Configuration

Each algorithm described above can be performed by using, for example, the hardware configuration of the information processing apparatus shown in FIG. 21. That is, processing of each algorithm can be realized by controlling the hardware shown in FIG. 21 using a computer program. Additionally, the mode of this hardware is arbitrary, and may be a personal computer, a mobile information terminal such as a mobile phone, a PHS or a PDA, a game machine, a contact or contactless IC chip, a contact or contactless IC card, or various types of information appliances. Moreover, the PHS is an abbreviation for Personal Handy-phone System. Also, the PDA is an abbreviation for Personal Digital Assistant.

As shown in FIG. 21, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

6: Summary

Lastly, the technical contents according to the embodiment of the present disclosure will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as below. The information processing apparatus includes a key holding unit and an interactive protocol execution unit as below. The key holding unit is for holding L (L≥2) secret keys $s_i$ (i=1 to L) and L public keys $y_i$ that satisfy $y_i=F(s_i)$ with respect to a set F of multivariate polynomials of n-th order (n≥2). Also, the interactive protocol execution unit is for performing, with a verifier, an interactive protocol for proving knowledge of (L−1) secret keys $s_i$ that satisfy $y_i=F(s_i)$. Furthermore, the interactive protocol execution unit prevents, at the time of performing the interactive protocol with the verifier, the verifier from knowing which secret key $s_i$ was used.

By causing the secret key $s_i$ to be a multiplexed key and using a part of the secret keys at the time of performing an interactive protocol and also by preventing which secret key $s_i$ was used from becoming known in the interactive protocol, a security level sufficient for an active attack can be guaranteed also in the case of the parallel-repetition configuration. That is, even if a falsifier tried to impersonate the verifier and tried to obtain information on the secret key $s_i$ that is used in the authentication, which secret key $s_i$ is used in the interactive protocol is not known even to the verifier. That is, even in a situation where the interactive protocol can be performed an arbitrary number of times, information on the secret key $s_i$ is not leaked by the prover, and a security level sufficient for an active attack can be guaranteed.

(Notes)

The information processing apparatus described above is an example of an authentication device on the prover side or the verifier side. Furthermore, the ROM 904, the RAM 906, the storage unit 920 and a removable recording medium 928 are examples of a key holding unit. Additionally, a secret key s i and a public key y i that are held in the key holding unit are generated by the key generation algorithm Gen. Furthermore, the prover algorithm P and the verifier algorithm V are examples of an interactive protocol execution unit. Additionally, in reality, the function of the interactive protocol execution unit is realized by the prover algorithm P or the verifier algorithm V being performed by the function of the CPU 902. Furthermore, the functions of a challenge reception unit, a challenge selection unit, a response generation unit, a response transmission unit and a message transmission unit are realized by the functions realized by the prover algorithm P. Additionally, the function of the communication unit 926 is used for the exchange of information.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

Gen key generation algorithm
P prover algorithm
V verifier algorithm
The invention claimed is:

1. An authentication device, comprising:
a Central Processing Unit (CPU) configured to:
generate L (L≥2) secret keys $s_i$ (i=1 to L) and L public keys $y_i$ that satisfy $y_i=F(s_i)$ with respect to a set F of multivariate polynomials of n-th order (n≥2);
execute, with a verifier, an interactive protocol to prove knowledge of (L−1) secret keys $s_i$ that satisfy $y_i=F(s_i)$; and
process, based on a falsification algorithm, a secret key $s_{i0}$ (1≤$i_0$≤L) in the interactive protocol, wherein the secret key $s_{i0}$ is a key other than the generated L secret keys $s_i$,
wherein to execute the interactive protocol, the CPU is further configured to:
receive L challenges $Ch_i$ from the verifier,
arbitrarily select (L−1) challenges $Ch_i$ from the L challenges $Ch_i$ received from the verifier,
generate, by use of the (L−1) secret keys $s_i$, (L−1) responses $Rsp_i$ respectively for the selected (L−1) challenges $Ch_i$, and
transmit the generated (L−1) responses $Rsp_i$ to the verifier.

2. The authentication device according to claim 1, wherein the CPU is further configured to:
transmit, to the verifier, a message $Cmt_i$ that corresponds to one of the L secret keys $s_i$, and
receive a challenge $Ch_i$ that indicates a verification pattern selected from k (k≥2) verification patterns by the verifier based on the transmitted message $Cmt_i$.

3. The authentication device according to claim 2, wherein, in an event the message $Cmt_i=(c_{i,1}, \ldots, c_{i,N})$,
the CPU is further configured to:
calculate a new message $Cmt'=H(Cmt_1, \ldots, Cmt_L)$ by use of a one-way function H,
transmit the new message $Cmt'$ to the verifier, and
transmit, together with a response of the (L−1) responses $Rsp_i$, an element of the message $Cmt_i$ that the verifier is unable to restore in an event the response is used.

4. An authentication device, comprising:
a Central Processing Unit (CPU) configured to:
generate L secret keys $s_i$ (i=1 to L) and L public keys $y_i$ that satisfy $y_i=F(s_i)$ with respect to a set F of multivariate polynomials of n-th order (n≥2);
process, based on a falsification algorithm, a secret key $s_{i0}$ (1≤$i_0$≤L) in an interactive protocol with a verifier, wherein the secret key $s_{i0}$ is a key other than the generated L secret keys $s_i$;
receive Q sets (Q≥2) of L challenges $Ch_i^{(j)}$ (j=1 to Q) from the verifier;
arbitrarily select one set of L challenges $Ch_i^{(j)}$ from the received Q sets of L challenges $Ch_i^{(j)}$;

generate, by use of the L secret keys $s_i$, L responses $Rsp_i$ respectively for the selected set of L challenges $Ch_i^{(j)}$; and
transmit the generated L responses $Rsp_i$ to the verifier.

5. The authentication device according to claim 4, wherein the CPU is further configured to:
transmit, to the verifier, a message $Cmt_i$ that corresponds to one of the L secret keys $s_i$, and
receive a challenge $Ch_i^{(j)}$ that indicates a verification pattern selected from k (k≥2) verification patterns by the verifier based on the transmitted message $Cmt_i$.

6. The authentication device according to claim 5, wherein, in an event the message $Cmt_i=(c_{i,1}, \ldots, c_{i,N})$,
the CPU is further configured to:
calculate a new message $Cmt'=H(Cmt_1, \ldots, Cmt_L)$ by use of a one-way function H,
transmit the new message $Cmt'$ to the verifier, and
transmit, together with a response of the L responses $Rsp_i$, an element of the message $Cmt_i$ that the verifier is unable to restore in an event the response is used.

7. An authentication method, comprising:
in an information processing apparatus comprising a Central Processing Unit (CPU):
generating L (L≥2) secret keys $s_i$ (i=1 to L) and L public keys $y_i$ that satisfy $y_i=F(s_i)$ with respect to a set F of multivariate polynomials of n-th order (n≥2);
executing, with a verifier, an interactive protocol for proving knowledge of (L−1) secret keys $s_i$ that satisfy $y_i=F(s_i)$; and
processing, based on a falsification algorithm, a secret key $s_{i0}$ (1≤$i_0$≤L) in the interactive protocol, wherein the secret key $s_{i0}$ is a key other than the generated L secret keys $s_i$,
wherein execution of the interactive protocol includes:
receiving L challenges $Ch_i$ from the verifier,
arbitrarily selecting (L−1) challenges $Ch_i$ from the L challenges $Ch_i$ that have been received,
generating, by using the (L−1) secret keys $s_i$, (L−1) responses $Rsp_i$ respectively for the (L−1) challenges $Ch_i$ that have been selected, and
transmitting the (L−1) responses $Rsp_i$ that have been generated to the verifier.

8. The authentication method according to claim 7, further comprising:
transmitting, to the verifier, a message $Cmt_i$ corresponding to one of the L secret keys $s_i$, and
receiving a challenge $Ch_i$ indicating a verification pattern selected from k (k≥2) verification patterns by the verifier based on of the transmitted message $Cmt_i$.

9. The authentication method according to claim 8, further comprising:
in an event the message $Cmt_i=(c_{i,1}, \ldots, c_{i,N})$,
calculating a new message $Cmt'=H(Cmt_1, \ldots, Cmt_L)$ using a one-way function H,
transmitting the new message $Cmt'$ to the verifier, and
transmitting, together with a response of the (L−1) responses $Rsp_i$, an element of the message $Cmt_i$ that the verifier is unable to restore in an event the response is used.

10. A non-transitory computer-readable medium having stored thereon computer-executable instructions, which when executed by a computer causes the computer to execute operations, comprising:
generating L (L≥2) secret keys $s_i$ (i=1 to L) and L public keys $y_i$ that satisfy $y_i=F(s_i)$ with respect to a set F of multivariate polynomials of n-th order (n≥2);

executing, with a verifier, an interactive protocol for proving knowledge of (L−1) secret keys $s_i$ that satisfy $y_i=F(s_i)$ using the interactive protocol on a verifier; and processing, based on a falsification algorithm, a secret key $s_{i0}$ ($1 \le i_0 \le L$) used in an interactive protocol, wherein the secret key $s_{i0}$ is a key other than the generated L secret keys $s_i$, wherein the execution of the interactive protocol includes:
 receiving L challenges $Ch_i$ from the verifier,
 arbitrarily selecting (L−1) challenges $Ch_i$ from the L challenges $Ch_i$ that have been received,
 generating, by using the (L−1) secret keys $s_i$, (L−1) responses $Rsp_i$ respectively for the (L−1) challenges $Ch_i$ that have been selected, and
 transmitting the (L−1) responses $Rsp_i$ that have been generated to the verifier.

11. The non-transitory computer-readable medium according to claim 10, further comprising:
 transmitting, to the verifier, a messages $Cmt_i$ corresponding to one of the L secret keys $s_i$, and
 receiving a challenge $Ch_i$ indicating a verification pattern selected from k ($k \ge 2$) verification patterns by the verifier based on the transmitted message $Cmt_i$.

12. The non-transitory computer-readable medium according to claim 11, further comprising:
 in an event the message $Cmt_i=(c_{i,1}, \ldots, c_{i,N})$,
 calculating a new message $Cmt'=H(Cmt_1, \ldots, Cmt_L)$ using a one-way function H,
 transmitting the new message $Cmt'$ to the verifier, and
 transmitting, together with a response of the (L−1) responses $Rsp_i$, an element of the message $Cmt_i$ that the verifier is unable to restore in an event the response is used.

13. An authentication method, comprising:
 in an information processing apparatus comprising a Central Processing Unit (CPU):
 generating L secret keys $s_i$ (i=1 to L) and L public keys $y_i$ that satisfy $y_i=F(s_i)$ with respect to a set F of multivariate polynomials of n-th order ($n \ge 2$);
 processing, based on a falsification algorithm, a secret key $s_{i0}$ ($1 \le i_0 \le L$) t in an interactive protocol with a verifier, wherein the secret key $s_{i0}$ is a key other than the generated L secret keys $s_i$;
 receiving Q sets ($Q \ge 2$) of L challenges $Ch_i^{(j)}$ (j=1 to Q) for the verifier;
 arbitrarily selecting one set of L challenges $Ch_i^{(j)}$ from the Q sets of L challenges $Ch_i^{(j)}$ that have been received;
 generating, by using the L secret keys $s_i$, L responses $Rsp_i$ respectively for the set of L challenges $Ch_i^{(j)}$ that have been selected; and
 transmitting the L responses $Rsp_i$ that have been generated to the verifier.

14. A non-transitory computer-readable medium having stored thereon computer-executable instructions, which when executed by a computer causes the computer to execute operations, comprising:
 generating L secret keys $s_i$ (i=1 to L) and L public keys $y_i$ that satisfy $y_i=F(s_i)$ with respect to multivariate polynomials F of n-th order ($n \ge 2$);
 processing, based on a falsification algorithm, a secret key $s_{i0}$ ($1 \le i_0 \le L$) in an interactive protocol with a verifier, wherein the secret key $s_{i0}$ is a key other than the generated L secret keys $s_i$;
 receiving Q sets ($Q \ge 2$) of L challenges $Ch_i^{(j)}$ (j=1 to Q) from the verifier;
 arbitrarily selecting one set of L challenges $Ch_i^{(j)}$ from the Q sets of L challenges $Ch_i^{(j)}$ that have been received;
 generating, by using the L secret keys $s_i$, L responses $Rsp_i$ respectively for the set of L challenges $Ch_i^{(j)}$ that have been selected; and
 transmitting the L responses $Rsp_i$ that have been generated to the verifier.

* * * * *